United States Patent [19]

Heijnemans

[11] Patent Number: 4,807,053
[45] Date of Patent: Feb. 21, 1989

[54] METHOD AND APPARATUS FOR RECORDING AND/OR REPRODUCING VIDEO INFORMATION IN/FOR A RECORD CARRIER, AND RECORD CARRIER OBTAINED BY MEANS OF THE METHOD

[75] Inventor: Werner A. L. Heijnemans, Eindhoven, Netherlands

[73] Assignee: U.S. Philips Corporation, New York, N.Y.

[21] Appl. No.: 924,547

[22] Filed: Oct. 29, 1986

[30] Foreign Application Priority Data

Jun. 5, 1986 [NL] Netherlands .................. 8601447

[51] Int. Cl.⁴ .............................. H04N 5/76
[52] U.S. Cl. ............................ 358/335; 358/105; 360/10.1
[58] Field of Search ............ 358/105, 310, 312, 335; 360/10.1, 10.3

[56] References Cited

U.S. PATENT DOCUMENTS 4,272,787  6/1981  Michael et al. ............... 360/10.1 X
4,403,250  9/1983  Kellar ........................ 358/335 X Primary Examiner—W. B. Perkey
Attorney, Agent, or Firm—Gregory P. Gadson

[57] ABSTRACT

In a method of recording video information in a record carrier, each picture of N×M picture elements being divided into subpictures of n×m picture elements, the video information of each subpicture is encoded in accordance with a transform coding and recorded on the record carrier. Moreover, corresponding subpictures of two pictures are compared with each other. To both subpictures a motion code is assigned, which motion codes are the same if the subpictures do not differ substantially from one another, but which are not the same if the subpictures differ substantially from each other. The motion is recorded on the record carrier together with the coded information of the subpicture. Moreover, different transform codings may be applied to the subpictures. A higher-order transform coding yields a more accurate information of the subpicture which is encoded. The associated transform code is also recorded on the record carrier. Further, a method of reproducing video information from the record carrier is described and apparatuses for carrying out the two methods are described.

15 Claims, 7 Drawing Sheets

METHOD AND APPARATUS FOR RECORDING AND/OR REPRODUCING VIDEO INFORMATION IN/FOR A RECORD CARRIER, AND RECORD CARRIER OBTAINED BY MEANS OF THE METHOD

BACKGROUND OF THE INVENTION

The invention relates to a method of recording video information in a record carrier, each picture of a sequence of pictures comprising N×M picture elements being divided into subpictures of n×m picture elements, the video information of each subpicture being encoded in accordance with a transform coding and the encoded information of the subpicture being recorded on the record carrier. The invention also relates to a method of reproducing video information from a record carrier, to apparatuses for carrying out the two methods, and to a record carrier obtained in accordance with the method of recording video information.

The article "Scene adaptive coder" by W. Chen et al in IEEE Transactions on Communications, Vol. COM-32, no. 3, March 1984 describes an apparatus for and a method of encoding video information, transmitting the encoded video information over a channel, and subsequently decoding the video information. The transform coding utilized for this purpose is the cosine transform. The following publications describe various (other) transform codings which can be employed for encoding and decoding pictures.

"Transform picture coding" by P. A. Wintz, Proc. of the IEEE, Vol. 60, no. 7, July 1972, pp. 809–820

"Digital image processing" by W. K. Pratt, Wiley and Sons, Chapter 10 "Two-dimensional unitary transforms", pp. 232–247

"Discrete cosine transform" by N. Ahmed et al, IEEE Trans. on Computers, January 1974, pp. 90–93.

Such codings are useful because a substantial data reduction can be achieved, enabling pictures to be transmitted over a channel of limited bandwidth.

If corresponding subpictures of a plurality of consecutive pictures do not differ too much from each other is also known to subject the first subpicture to a specific basic or first transform coding and to subject the corresponding subpicture of the next picture to a second transform coding which, on the basis of and utilizing the results of the transform coding applied to the first subpicture, provides a more accurate coding of the corresponding subpicture of the next picture, etc. After decoding this results in a subpicture of the next picture having a higher accuracy and being better in conformity with the relevant subpicture prior to coding. Such coding and decoding methods are referred to as interframe coding and decoding and are described in for example:

"Interframe cosine transform image coding" by J. A. Roese et al, IEEE Trans. on Communications, Vol. COM-25, No. 11, Nov. 1977, pp. 1329–1338, and European Patent Application EP No. 123,456.

Thus, the use of data compression enables the playing time of a record carrier to be extended. Possibilities to do so include the (aforementioned) interframe coding or an intrafield/frame coding. The data compression attainable with intrafield/frame coding (being a two-dimensional coding) is not as high as that attainable with interframe coding. Intrafield/frame coding, however, does not give rise to any problems with trick modes (record-carrier transport at a higher or lower speed). This is because in intrafield coding each field and in interframe coding each frame or picture unit. Interframe coding problems are encountered if trick (comprising two fields) is encoded and decoded as a separate modes are to be utilized. This is because interframe coding uses the correlation between (sub-)pictures at different instants. Therefore, interframe coding is a three-dimensional coding (namely in the space and time domain).

SUMMARY OF THE INVENTION

It is the object of the invention to provide steps which enable trick modes to be used, while maintaining the advantage of interframe coding, i.e. the very efficient data reduction (far more efficient than in intrafield/frame coding). This means that reproduction is possible at different speeds in the forward or reverse direction, at normal speed, increased speed or, conversely, reduced speed.

To this end, the method of recording video information in record carriers is characterized in that during recording, a motion code is assigned to all subpictures in such a way that the video information of corresponding subpictures of a specific picture and of a previous picture are compared with each other and that if the difference between the video information of the two subpictures is smaller than or equal to a specific first value a first motion code is assigned to the subpicture of the first-mentioned picture, and that if the difference between the video information of the two subpictures exceeds the first value, a second motion code is assigned to the subpicture of the first-mentioned picture, and in that the motion codes together with the encoded video information of the associated subpictures are recorded on the record carrier. The difference between the video information of two corresponding subpictures can be determined, for example, by means of the following formula:

$$\sum_r |V_{r,y} - V_{r,z}|$$

or by means of the formula:

$$\sum_r (V_{r,y} - V_{r,z})^2$$

In both formulae a summation is applied to all the picture elements of a subpicture. This means that r ranges from 1 to n×m inclusive. The subpicture of one picture bears the index y and the corresponding subpicture of the other picture bears the index z. If there are two consecutive pictures, y=z+1 is valid. $V_{r,y}$ may be, for example, the value of the luminance component (if desirable together with the chrominance component) of the picture element r. Another possibility is that $V_{r,y}=C_{r,y}$, which means that $V_{r,y}$ corresponds to the coefficient $C_{r,y}$ associated with the picture element r, for this see the description with reference to FIG. 2, or $V_{r,y}=C(i,j)$.

Other methods of determining the difference between the video information of two subpictures are described in various publications relating to interframe coding.

The motion code need not be a more indication of movement between the two subpictures. The motion code may be a measure of whether or not a change, for example a colour change, has taken place.

When a motion code is assigned to each subpicture it is found to be possible that subpictures which have been processed separately during recording may be combined during reproduction in order to obtain a higher accuracy. The method may be characterized further in that the motion code associated with the corresponding subpicture of the previous picture is a specific number, in that the first motion code is equal to said number, and in that the second motion code is equal to said number plus a specific constant, for example one. Corresponding subpictures of consecutive pictures having the same motion code consequently bear much resemblance to one another, while between corresponding subpictures of consecutive with different motion codes an impermissible change has taken place, so that the use of a second or higher-order transform coding will not yield more accurate coding of the subpicture.

The subpicture of the first-mentioned picture may be compared with, for example the corresponding subpicture of the picture directly preceding said first-mentioned picture.

Another possibility is to compare this subpicture with the corresponding subpicture of a picture preceding the first-mentioned picture even much earlier. For example, it is possible to select that corresponding subpicture for which the motion code has been modified most recently.

The method may be characterized further in that a subpicture of a specific picture is encoded in accordance with a first transform coding and in that the corresponding subpicture of the next picture is encoded in accordance with the same transform coding if the difference between the video information of the two subpictures exceeds a specific second value, and in that the corresponding subpicture of the next picture is encoded in accordance with a second transform coding if the difference between the video information of the two subpictures is smaller than or equal to the second value, in that utilizing the results of the first transform coding applied to the first-mentioned subpicture, the second transform coding provides a more accurate coding of the video information of the subpicture of the next picture, and in that together with the encoded video information of the subpicture of the next picture the information about the transform coding applied to the video information of the subpicture of the next picture is recorded on the record carrier. The difference between the video information of corresponding subpictures of subsequent pictures can be determined in the same way as described hereinbefore. Further, the second value may be selected to be equal to the first value.

The method in which the second transform coding is applied to the corresponding subpicture of the next picture may be characterized further in that the corresponding subpicture of the next but one picture is encoded in accordance with the first transform coding if the difference between the video information of the subpictures of the next but one picture and the first-mentioned or the next picture exceeds said second value, and in that the corresponding subpicture of the next but one picture is encoded in accordance with a third transform coding if said difference is smaller than or equal to said second value, in that, utilizing the results of the first and the second transform coding applied to the subpicture of the first-mentioned picture and the corresponding subpicture of the next picture respectively, the third transform coding provides an even more accurate coding of the video information of the subpicture of the next but one picture, and in that together with the encoded video information of the subpicture of the next but one picture the information about the transform coding applied to the video information of the subpicture of the next but one picture is recorded on the record carrier. This method may be extended if a further increase in accuracy in the transform coding of subpictures of subsequent pictures is desired.

However, it is also possible, when a certain higher-order transform coding is reached, to provide an automatic change-over to the first transform coding for encoding the corresponding subpicture of the following picture.

Yet another possibility is to encode all subpictures of a picture in conformity with the first transform coding after every p pictures. This measure is of particular importance for the reproduction of video information at a higher speed. The value p is then selected in such a way that during reproduction at a higher-speed at regular intervals those subpictures are read to which during recording the (compulsory) first transform coding has been applied. In the foregoing it has been stated that for determining whether the third transform coding may be applied it must be ascertained whether the difference between the video information of the subpictures of the next but one picture and the first-mentioned or the next picture exceeds or does not exceed said second value. Instead of this, it is also possible to compare this difference with a third value which is smaller than the second value. This means that a stricter requirement is imposed on the use of the third transform coding than on the use of the second transform coding.

The method of reproducing video information from a record carrier, which video information has been recorded in the record carrier in accordance with any one of the methods described in the foregoing, in which during reproduction the encoded information of the subpictures is read from the record carrier, the encoded information of each subpicture is decoded in accordance with a specific transform decoding, and the video information for consecutive pictures of $N \times M$ picture elements is derived from the video information of consecutive subpictures of $n \times m$ picture elements, is characterized in that during reproduction, together with the encoded video information of each subpicture, the motion code associated with said subpicture is read from the record carrier. Moreover, together with the coded video information of each subpicture, the information about the transform coding applied to the video information of a subpicture during recording can be read from the record carrier.

After the foregoing, it will be evident that during reproduction, if the motion codes of a subpicture of a picture read at a specific instant and of a corresponding subpicture of a picture read previously are not the same, the information of the two subpictures read from the record carrier is not combined to provide a more accurate subpicture at this instant. In that case, if the relevant subpicture of the picture read at the relevant instant has been coded in accordance with the first transform coding during recording, the information of the relevant subpicture thus read is subjected to a coding which is the inverse of said first transform coding and, if the relevant subpicture of the picture read at the relevant instant has been encoded in accordance with a transform coding other than the first transform coding during recording, the corresponding subpicture of a picture previously read is repeated.

If the motion codes of a subpicture of a picture read at a specific instant and of a corresponding subpicture of a picture read previously are the same and, moreover, one of the two subpictures has been coded in accordance with the first transforming coding during recording and the other one of the two subpictures has been coded in accordance with the second transform coding during recording, the information of the two subpictures read from the record carrier may be combined to obtain a more accurate subpicture at said instant. This means that this combination is possible regardless of the sequence of the two subpictures. This also means that it is possible to combine two subpictures of which the subpicture of the picture read at a specific instant has been coded in accordance with the first transform coding during recording and of which the subpicture of the picture read previously has been coded in accordance with the second transform coding during recording. It is obvious that this may be extended to a combination of three or more corresponding subpictures having the same motion code.

An apparatus for recording video information in a record carrier, comprising an input terminal for receiving a video signal, a first unit having an input coupled to the input terminal and having an output, for dividing consecutive pictures of N×M picture elements into subpictures of n×m picture elements, a coding unit having an input coupled to the output of the first unit and having an output, for subjecting the video information of each subpicture to a transform coding, a write unit having an input, coupled to the output of the coding unit, for recording the coded information of each subpicture on the record carrier, is characterized in that the apparatus further comprises a comparator unit, having a first input and a second input and an output, for comparing the video information (which may have been transformed already) of corresponding sub pictures of a specific picture and of a previous picture, and for determining whether the difference between the video information(which may have been transformed already) of the two subpictures exceeds or does not exceed said first value, and for producing on its output a first control signal or a second control signal, as appropriate, a first memory having an output coupled to the first input of the comparator unit, for storing the video information (which may have been transformed already) of the corresponding subpicture of the previous picture, a second unit having an input coupled to the output of the comparator unit and having an output, for producing a first motion code or a second motion code on its output, depending on the control signal from the comparator unit, a signal combination unit having a first input coupled to the output of the encoding unit, having a second input coupled to the output of the second unit, and having an output coupled to the input of the write unit, for adding the first or the second motion code to the coded video informationof the relevant subpicture of the first-mentioned picture.

In order to obtain the correct motion code, the apparatus may be characterized further in that the second unit comprises a second memory for the storage of the motion code associated with the corresponding subpicture of the previous picture and an adder unit having a first input coupled to the output of the second memory, having a second input for applying the constant, having a control input coupled to the output of the comparator unit, and having an output coupled to the output of the second unit, and in that the adder unit is adapted to transfer the motion code applied to the first input to the output under the influence of the second control signal from the comparator unit, and is adapted to add, under the influence of the first control signal from the comparator unit, the constant to the motion code applied to the first input. If the subpicture of a picture appearing at a specific instant should always be compared in the comparator unit with that corresponding subpicture of a previous picture for which the motion code has been changed most recently during recording, the apparatus should be characterized further in that the output of the comparator unit is coupled to a load input of the first memory, for loading the video information (which may have been transformed) of the relevant subpicture of the first-mentioned picture when the first control signal from the comparator unit appears. In this way it is achieved that each time that the motion code for a subpicture changes this subpicture is stored in the first memory and a corresponding subpicture of a subsequent picture is compared with this subpicture which is newly stored in the first memory.

The apparatus may be characterized further in that the coding unit is adapted to subject the corresponding subpicture of the next picture to at least the first or the second transform coding depending on a first or a second transform code to be applied to a control input of the coding unit, in that the apparatus further comprises a second comparator unit having a first and a second input and having an output, for comparing the video information (which may have been transformed already) of the corresponding subpictures of the first-mentioned picture and the next picture with one another, and to determine whether the difference between the video information (which may have been transformed already) of the two subpictures exceeds or does not exceed said second value, and to produce on its output the first or the second transform code, as appropriate, which output is coupled both to the control input of the coding unit and to a third input of the signal combination unit, which signal combination unit is further adapted to add the first or the second transform code to the coded video information of the relevant subpicture of the next picture. For additionally subjecting the video signal of a subpicture to the third transform coding the apparatus may be characterized in that the coding unit is moreover, adapted to subject the corresponding subpicture of the next but one picture to the third transform coding depending on a third transform code supplied by the second comparator unit, and in that the second comparator unit is adapted to supply the third transform code if the difference between the video information (which may have been transformed already) of the corresponding subpictures of the next but one picture and the first-mentioned or the next picture is smaller than or equal to said second value, and to subject the corresponding subpictures of the first-mentioned and the next picture to the first and second transform coding respectively. It is obvious that the apparatus may also be constructed in such a way that even higher-order codings can be applied to the video signal in order to obtain a higher accuracy during coding.

The apparatus for reproducing video information from a record carrier, comprising
a read unit for reading the coded information of each subpicture from the record carrier,
a decoding unit, having an input coupled to an output of the read unit and having an output, for applying a transform decoding to the coded information of each subpicture read from the record carrier,
a third unit, having an input coupled to the output of the decoding unit and having an output, for deriving consecutive pictures of N×M picture elements from the subpictures of n×m picture elements,
an output terminal for supplying the video signal, which output terminal is coupled to the output of the third unit, is characterized in that the read unit is constructed to read the motion code associated with each subpicture from the record carrier.

The apparatus may be characterized further in that the read unit is moreover adapted to read the transform code from the record carrier, which code provides the information about the transform coding applied to the video information of the subpicture during recording, in that the apparatus comprises a fourth unit having an input coupled to the output of the read unit, having a first output coupled to the input of the decoding unit, and having a second output coupled to a control unput of the decoding unit, in that the fourth unit is constructed to separate the transform code from the encoded video information of said subpicture, to supply the coded video information to its first output, and to supply the transform code to its second output.

Moreover, the apparatus may be characterized further in that the fourth unit is moreover adapted to extract the motion code of a subpicture from the coded video information of the subpicture and to supply the motion code to a third output, in that the third output is coupled to an input of a memory for the storage of the motion code of the subpicture being read and of the motion code of the corresponding subpicture of the picture read previously, in that an output of the memory is coupled to a comparator, for applying the two motion codes to the comparator, which comparator is constructed to compare the two motion codes with each other and to produce a third or a fourth control signal on an out put if the two motion codes are equal or not equal, which output is coupled to a second control input of the decoding unit.

For decoding the information read from the record carrier the apparatus is characterized, for example, in that if the comparator produces a fourth control signal on its output and if on its second output the fourth unit supplies a first transform code associated with the relevant subpicture of the picture read at the relevant instant, the decodingunit is adapted to apply a coding inverse to the first transform coding to the coded information of the relevant subpicture, in that if the fourth unit supplies a transform code other than the first code on its second output the decoding unit is adapted to repeat the corresponding subpicture of the picture read previously, and in that for this purpose the decoding unit comprises a second memory for storing the corresponding subpicture of the picture read previously. This apparatus may be characterized further in that if the comparator produces a third control signal on its output and if on its second output the fourth unit has supplied the first transform code for one of the two subpictures and the second transform code for the other subpicture, the decoder unit is adapted to apply a coding inverse to the second transform coding to the information of the two subpictures read from the record carrier. This enables a more accurate subpicture to be obtained than in the case that only the first transform code is applied to the first-mentioned subpicture. The apparatus may be characterized further in that the memory is adapted to store the motion code of the corresponding subpicture of the picture read prior to the picture read previously, in that the output of the memory is coupled to the comparator to supply the three motion codes to the comparator, which comparator is adapted to compare the three motion codes with each other and to supply a fifth control signal on its output if the three motion code are equal to each other, and in that if the comparator supplies a fifth control signal on its output and, if the fourth unit supplies a first transform code for one of the three subpictures, the second transform code for another one of the three subpictures and the third transform code for the third subpicture, the decoding unit is adapted to subject the information of the three subpictures read from the record carrier to a coding inverse to the third transform coding. This enables an even more accurate subpicture to be obtained after reproduction.

DESCRIPTION OF THE DRAWINGS

Embodiments of the invention will now be described in more detail, by way of example, with reference to the drawings. In the drawings

DETAILED DESCRIPTION

Figure 1:
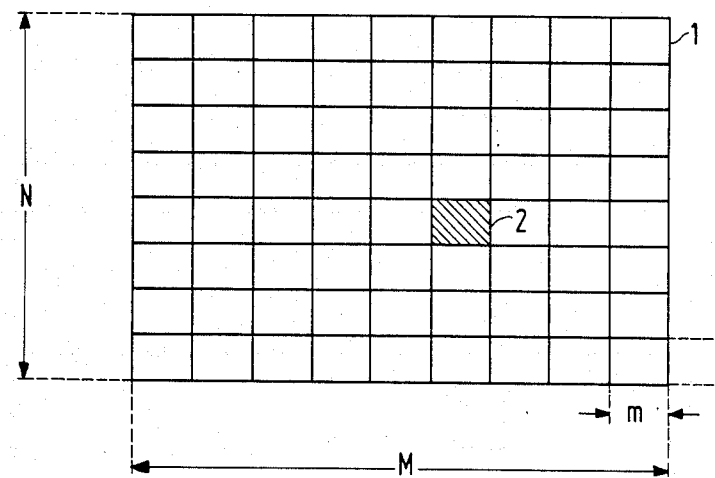
FIG. 1 shows a picture comprising N×M picture elements, which picture is divided into subpictures of nxm picture elements.
Figure 2A:
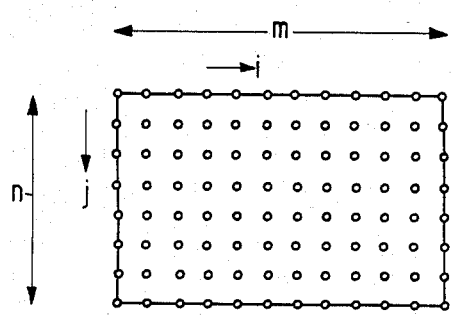
FIG. 2a shows a subpicture of n×m picture eleents (i,j)

FIG. 1 shows a picture 1 comprising N×M picture elements (pixels). The picture 1 is divided into a plurality of subpictures, of which one subpicture is represented schematically by the hatched block 2. The subpictures comprise n×m picture elements. FIG. 2a shows a subpicture to an enlarged scale. As is known from the literature each subpicture may be subjected to a transformation, in order to obtain data compression of the video information of each subpicture. Known transformations include the discrete cosine transformation, the Hadamard transformation and the Slant transformation.

Figure 2B:
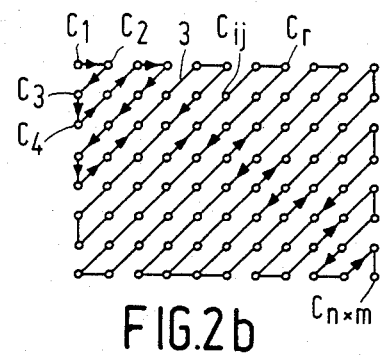
FIG. 2b shows the corresponding matrix of coefficients C(i,j)

These transformations ensure that the video information of the picture elements (i,j) of a subpicture are transformed into a set of coefficients $C(i,j)$ associated with this subpicture. See FIG. 2b. This yields an $n \times m$ matrix of coefficients for each subpicture with coefficients $C(i,j)$. The coefficients are associated with a spatial frequency, the coefficients of a low sum sequence number $i+j$ being related to low spatial frequencies and coefficients of a higher sum sequence number $i+j$ being related to high spatial frequencies. It is to be noted that an inverse transform applied to the coefficient $C(i,j)$ then yields the original subpicture.

Moreover, it is found that some transformations concentrate the energy of a subpicture in a number of coefficients smaller than the number of picture elements. Therefore, the best transformation is the Karhunen-Loëve transformation. The discrete cosine transformation also provides a very satisfactory concentration. This effect is also referred to as "redundancy reduction". It is obvious that this effect results in a data reduction.

Moreover, coefficients associated with a higher spatial frequency may be represented with a less high (quantization) accuracy than coefficients associated with a lower spatial frequency. This because quantization errors in coefficients associated with a high spatial frequency lead to high-frequency quantization in a reconstructed subpicture, to which high-frequency quantization noise the visual system, i.e. the human eye, is less sensitive. This effect is known as "irrelevancy reduction".

Both effects result in a quantization in conformity with, for example, the curve $Q_1$ in FIG. 3. In FIG. 3 the curve $Q_1$ is plotted as a function of r, r being the sequence number of the coefficients $C(i,j)$ in FIG. 2b in increasing order along the line 3 in FIG. 2b. The degree of accuracy A is plotted along the vertical axis, the value 1 representing 100% accuracy. In fact, for a specific r the curve $Q_1$ represents the ratio between the value in which the coefficient is expressed (after quantization) and the real value of the coefficient. It is evident from FIG. 3a that, in the present example, the coefficients are (may be) selected to be zero from a specific sequence number $r=k$.

The operation of coding the video information of a subpicture to form coefficients with an accuracy as represented by the curve $Q_1$ in FIG. 3 will be referred to hereinafter as the first transform coding $T_1$.

Figure 3A:
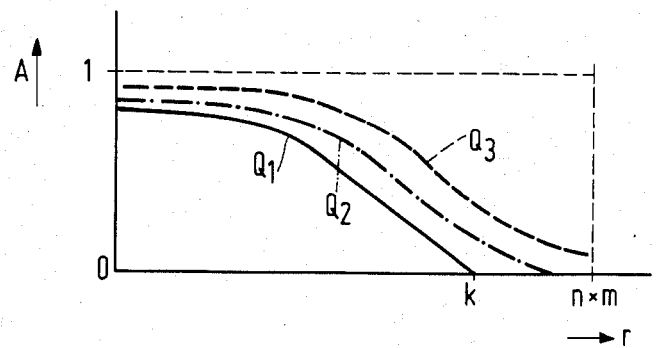
FIG. 3a represents the accuracy with which the coefficients of a coded subpicture are reproduced for different transform codings.
Figure 3B:
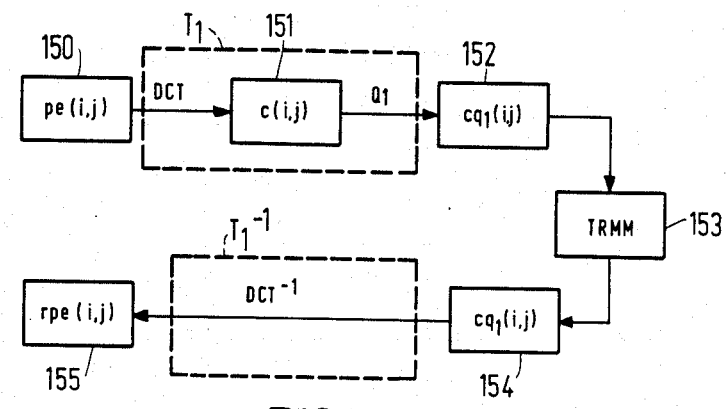
FIGS. 3b, 3c and 3d show examples of a first, second and a third transform coding and the codings which are inverse thereto.

The first transform coding $T_1$ is represented in more detail in FIG. 3b. The block 150 schematically represents a subpicture comprising picture elements $pe(i,j)$. The video information corresponding to these picture elements $pe(i,j)$ is transfomed into coefficients $C(i,j)$, see block 151, utilizing a specific transform, in the present case the discrete cosine transforrm DCT. Subsequently, the coefficients $C(i,j)$ are in quantized in conformity with the curve $Q_1$ in FIG. 3a to form quantized coefficients $Cq_1(i,j)$ see block 15.2. After this, these coefficients $Cq_1(i,j)$ are recorded on the transmission medium TRMM, the record carrier (see block 153). The discrete cosine transform DCT followed by the quantization step $Q_1$ form, in fact, the first transform coding $T_1$, indicated by means of the dashed block. This transform coding $T_1$ may also include the omission of coefficients which are zero, although this requires additional information to indicate which coefficients are zero and have been omitted.

Subsequently, a subpicture encoded in conformity with the first transform coding may be decoded by means of a coding $T_1^{-1}$ inverse to the first transform coding, see FIG. 3b. The coefficients $Cq_1(i,j)$ read from the record carrier 153 are restored to a matrix form, see block 154, and subsequently the inverse discrete cosine transform $DCT^{-1}$ is applied. This yields the reconstructed picture elements $rpe(i,j)$, see block 155. As this decoding is not based on coefficients of 100% accuracy, the subpicture obtained after decoding will deviate (slightly) from the subpicture prior to coding.

Corresponding subpictures of succeeding pictures may be coded in the same way in conformity with the first transform coding.

Subpictures of a picture which differ substantially from corresponding subpictures of the picture preceding said picture will therefore also be coded in accordance with said first transform coding.

Subpictures of a picture which do not (or hardly) differ from corresponding subpictures of a picture preceding the first-mentioned picture, however, may be subjected to another (second) transform coding $T_2$ which, starting from the first transform coding applied to the corresponding subpicture of the preceding picture, enables a more accurate coding of the coefficients $C(i,j)$ for the subpicture of the current picture to be obtained. In FIG. 3 this is schematically represented by means of the curve $Q_2$.

Figure 3C:
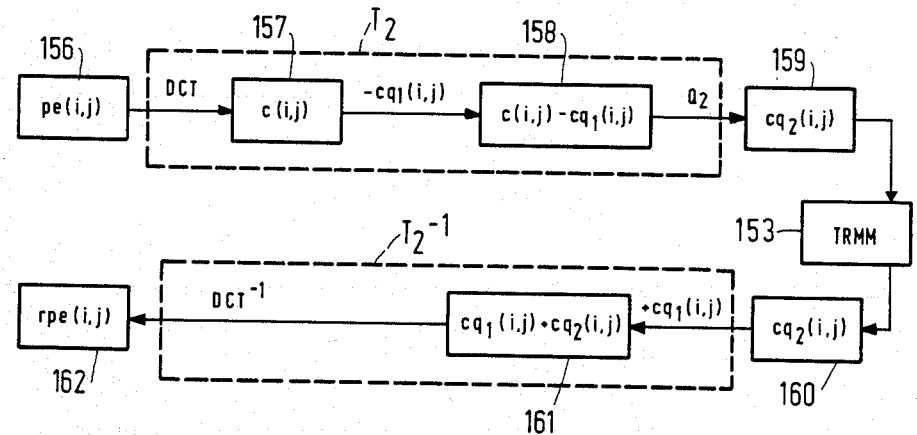

FIG. 3c illustrates how this second transform coding $T_2$ and the inverse coding $T_2^{-1}$ can be realized. It is assumed that the block 156 represents the subpicture of a succeeding picture corresponding to the subpicture of FIG. 3b (block 150). The picture elements $pe(i,j)$ are again subjected to a discrete cosine transform DCT, yielding the coefficients $C(i,j)$ see block 157. Subsequently, the coefficients $Cq_1(i,j)$ of the corresponding subpicture of the preceding picture obtained in conformity with the coding $Q_1$ are subtracted from said coefficients $C(i,j)$ see block 152. This results in the matrix of coefficients in block 158 It is evident that the coefficients $Cq_1(i,j)$ have been stored to enable them to be used for the second transform coding $T_2$ (and subsequently for the third transform coding $T_3$, see FIG. 3d). Subsequently, in conformity with the curve $Q_2$ in FIG. 3a, the coefficients $C(i,j)-Cq_1(i,j)$ are quantized to form coefficients $Cq_2(i,j)$, see block 159. After this, these coefficients are recorded on the record carrier TRMM153. The transform DCT, the subtraction and the subsequent coding (quantization) $Q_2$ together form the second transform coding $T_2$, see the dashed block $T_2$. Again, this transform coding may include the omission of coefficients which are zero, including the addition of information about the discarded coefficients.

The coefficients $Cq_2(i,j)$ read from the record carrier 153 are restored to the matrix form, see block 160. Subsequently, the coefficients $Cq_1(i,j)$ of the corresponding subpicture of the preceding picture are again added to said coefficients, see block 161, and the resulting coefficients $Cq_1(i,j)+Cq_2(i,j)$ are again subjected to the inverse discrete cosine transform, yielding the reconstructed subpicture $rpe(i,j)$ (block 162). The dashed block $T_2^{-1}$ indicates what belongs to the inverse transform coding $T_2-1$.

It is evident that during decoding the coefficients $Cq_1(i,j)$, read during decoding of the corresponding subpicture of the preceding picture, i.e. block 154, must be stored in order to enable them to be used in the transform coding(s) $T_2^{-1}$ (and $T_3-1$). Similarly, the coefficients $Cq_2(i,j)$ must be stored during recording and reading because they are needed for carrying out the transform codings $T_3$ and $T_3^{-1}$, as will become apparent hereinafter.

After decoding in conformity with $T_2^{-1}$ subpicture is obtained which bears a greater resemblance to the subpicture prior to coding than in the case that the subpicture is coded in accordance with the first transform coding and is subsequently decoded in conformity with a coding inverse thereto.

In the same way, a corresponding subpicture of yet another succeeding picture can be coded in conformity with a third transform coding $T_3$, still assuming that there are negliable or no differences between the corresponding subpictures of the preceding picture and/or the picture preceding the latter. If the first and second transform codings have been applied to the corresponding subpictures of the preceding two pictures, this third transform coding enables an even more accurate encoding of the coefficients $C(i,j)$ of the subpicture to be obtained, so that after decoding in conformity with the coding inverse to the third transform coding an even more faithful subpicture is obtained. FIG. 3a represents the resulting accuracy of the third transform coding by means of the curve $Q_3$.

Figure 3D:
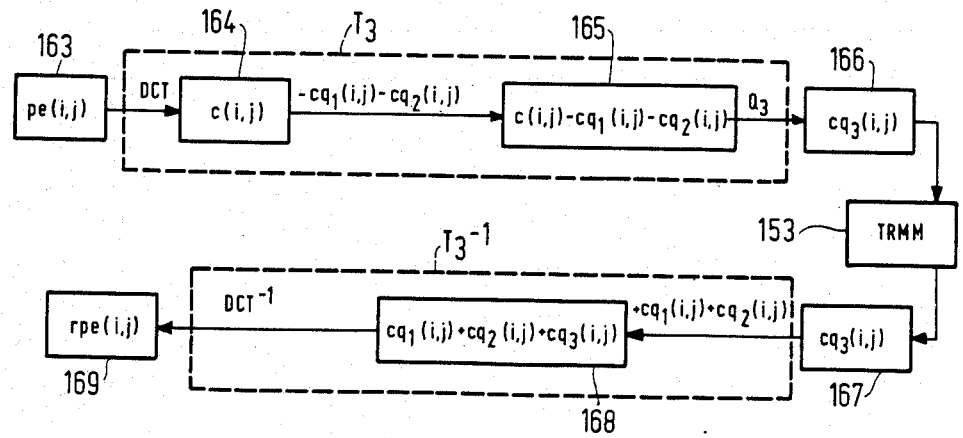

FIG. 3d gives the transform coding $T_3$ in greater detail. The picture elements pe(i,j), block 163, are coded and yield the coefficients $C(i,j)$, block 164. Subsequently, the coefficients $Cq_1(i,j)$ and $Cq_2(i,j)$ of the corresponding subpictures of the two preceding pictures obtained in conformity with the codings $Q_1$ and $Q_2$ respectively are subtracted from said coefficients, see block 152 and block 159. This results in the matrix of coefficients represented by the block 165. After this, the coefficients $C(i,j)-Cq_1(i,j)-Cq_2(i,j)$ are coded (quantized) in conformity with the curve $Q_3$ in FIG. 3a (see block 166), to obtain the coefficients $Cq_3(i,j)$. These coefficients are recorded on the record carrier TRMM.

After read-out, $Cq_1(i,j)$ and $Cq_2(i,j)$ are added to the coefficients $Cq_3(i,j)$ (see block 168), and the inverse discrete cosine transform $DCT^{-1}$ is applied. The dashed blocks indicate what belongs to the transform codings $T_3$ and $T_3^{-1}$, respectively.

A further increase of the accuracy of the coefficients to be recorded on the record carrier can, of course, be achieved by applying transform codings of even higher order.

It is to be noted that the transform codings and decodings described with reference to FIGS. 3b, 3c and 3d form only one method of obtaining a video-data compression based on a transform coding. There are further methods of achieving data compression. For this, reference is made to the literature relating to this subject.

Whether a higher-order transform coding can be applied to a subpicture of a picture, as stated previously, depends on whether the corresponding subpictures of the picture and the preceding picture (or an earlier picture) differ much from one another.

For this purpose, the video information of two subpictures must be compared. This may be effected in a manner as described hereinbefore.

If the difference between the video information of the subpictures of a previous picture and a subsequent picture is smaller than or equal to the second value, a higher-order transform coding may be applied to the subpicture of the subsequent picture. If the difference is greater than said second value, the first transform coding is applied to the subpicture.

As the coded information is being recorded on a (for example magnetic) record carrier, the information about the transform coding applied to the video information of the subpicture, together with this coded information, should be recorded on the record carrier.

Moreover, together with the coded information of a subpicture a motion code mc associated with this subpicture is recorded on the record carrier.

A subpicture of a specific picture has, for example, a specific first motion code $mc_1$. Again, the video information of this subpicture and that of the corresponding subpicture of the subsequent picture are compared with each other in the manner described hereinbefore. If the difference between the video information of the two subpictures exceeds a specific first value (which may be, for example, equal to the afore mentioned second value), a second motion code $mc_2$ is assigned to the subpicture of the subsequent picture.

For example: $mc_2=mc_1+a$, where a is a constant which is, for example, equal to 1.

If the difference between the video information of the subpictures is smaller than or equal to a first value, for example, the first motion code $mc_1$ is assigned to the subpicture of the subsequent picture.

Assigning a motion code to each subpicture of a picture and recording this motion code on the record carrier together with the coded video information of the subpicture is necessary in order to enable a more accurate decoding and, consequently, a more accurate reproduction of a subpicture to be obtained during reading of the information and the subsequent decoding of this information.

Figure 4A:
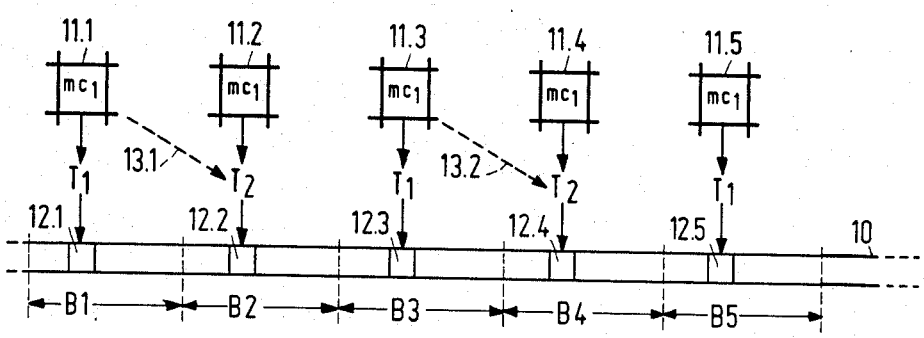
FIG. 4a to 4d illustrate four methods of recording video information in a record carrier.

FIG. 4a shows schematically the method of recording video information on a record carrier 10, for example a magnetic tape. The method is such that a subpicture can be encoded only in accordance with the first transform coding $T_1$ ot the second transform coding $T_2$. If a subpicture of a specific picture has been coded in accordance with the second transform coding $T_2$ the corresponding subpicture of the next picture is encoded in accordance with a first transform coding $T_1$, regardless of whether the two subpictures differ much from one another. FIG. 4a shows corresponding subpictures 11.1 to 11.5 of five consecutive pictures B1 to B5. The corresponding motion code mc is given in each block representing a subpicture. It is obvious that the corresponding subpictures 11.i of the consecutive pictures $B_i(1 \leq i \leq 5)$ do not differ much from one another, because all the subpictures have the same motion code $mc_1$.

It is assumed that the subpicture 11.1 is encoded in accordance with the first transform coding $T_1$. The encoded information is subsequently recorded in part 12.1 of the record carrier 10, together with the motion code $mc_1$ and the information $(t_1)$ about the transform coding which has been applied (hereinafter referred to as the transform code). The other subpictures of the picture $B_1$ are also recorded in the part B1 of the record carrier 10. As the corresponding subpicture 11.2 of the picture $B_2$ does not differ much from the subpicture 11.1 (assuming that the aforementioned first and second values are equal, it is also possible to consider the motion code hereinafter), the second transform coding $T_2$ is applied to the subpicture 11.2, utilizing the results of the first transform coding applied to the subpicture 11.1 (schematically indicated by means of the arrow 13.1). Subsequently, the coded information, together with the motion code $mc_1$ and the transform code $T_2$, is recorded in part 12.2 of the record carrier 10.

Again the first transform coding $T_1$ is applied to the subpicture 11.3 of the next picture $B_3$ and the coded information, together with the motion code $mc_1$ and its transform code $T_1$, is recorded in part 12.3 of the record carrier.

Since the motion codes associated with the subpictures 11.3 and 11.4 are the same, the field 11.4 may again be subjected to the second transform coding (see the arrow 13.2). The coded information, together with the motion code $mc_1$ and the transform code $T_2$, are recorded in part 12.4 of the record carrier. The first transform coding $T_1$ is then applied to the subpicture 11.5 and the coded information, together with the codes $mc_1$, $T_1$, is recorded in part 12.5 of the record carrier.

Figure 4B:
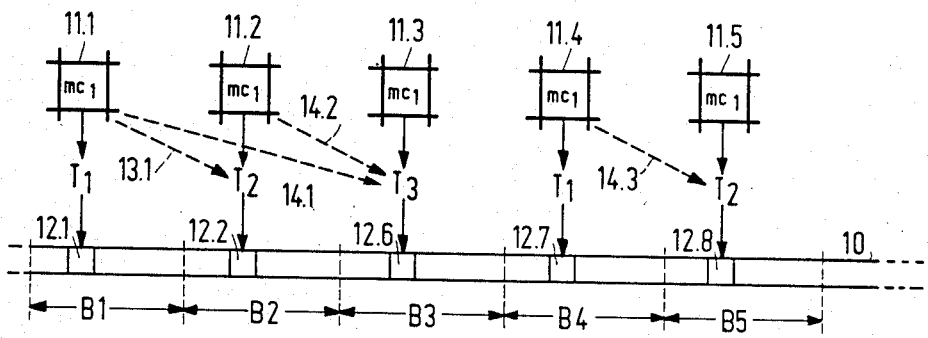

FIG. 4b shows schematically a method of recording video information on a record carrier 10, in which method the subpicture may be subjected to the first, or the second, or the third transform coding. If a subpicture of a specific picture has been encoded in accordance with the third transform coding $T_3$ the corresponding subpicture of the next picture is always encoded in accordance with the first transform coding $T_1$. FIG. 4b shows (the same) corresponding subpictures 11.1 to 11.5 of five consecutive pictures $B_1$ to $B_5$. Recording of the subpictures 11.1 and 11.2 proceeds in the same way as described with reference to FIG. 4a. As the subpicture 11.3 has the same motion code as the subpictures 11.1 and 11.2 and consequently differs little from the subpicture 11.1 and/or 11.2 (depending on the fact with which of the two subpictures the subpicture 11.3 has been compared), the third transform coding $T_3$ may be applied to the subpicture 11.3, use being made of the results of the first and the second transform codings applied to the subpictures 11.1, and 11.2 respectively. This is indicated schematically by means of the arrows 14.1 and 14.2. Now the coded information, together with the codes $mc_1$, $T_3$, is recorded in part 12.6 of the record carrier 10. The subpicture 11.4 is encoded in accordance with the transform coding $T_1$ and is recorded, together with the codes $mc_1$, $T_1$ in part 12.7 of the record carrier 10. The subpicture 11.5 is again encoded in accordance with the second transform coding $T_2$ (see the arrow 14.3) and is recorded in part 12.8 of the record carrier 10, together with the codes $mc_1$, $T_2$.

Figure 4C:
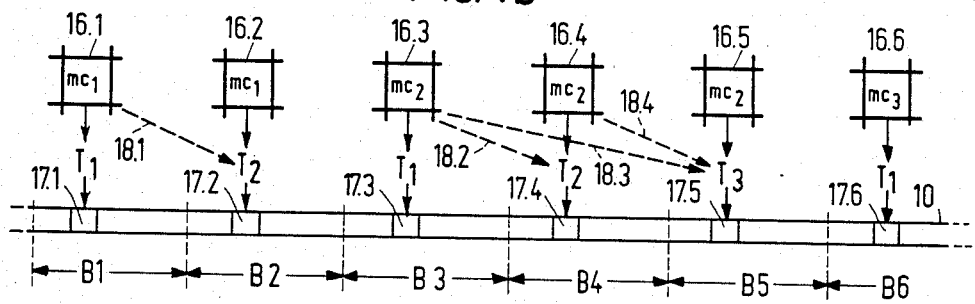

FIG. 4c illustrates a method of recording video information on a record carrier, in which method at least the third transform coding and, if desired, higher-order transform codings may be applied to the video information of a subpicture. FIG. 4c shows corresponding subpictures 16.1 to 16.6 of consecutive pictures $B_1$ to $B_6$, respectively. Recording of the subpictures 16.1 and 16.2 is effected in the same way as recording of the subpictures 11.1 and 11.2 as described with reference to FIG. 4a. Subsequently, the video information of the subpicture 16.3 is compared with that of the subpicture 16.1 or 16.2. The difference is found to be greater than the first value. The motion code associated with the subpicture 16.3 now becomes $mc_2$ ($=mc_1+a$). Since it is assumed that the first value is equal to the second value, the first transform coding $T_1$ should again be applied to the subpicture. The coded information and the codes $mc_2$, $T_1$ are now recorded in part 17.3 of the record carrier 10.

Again, the subpicture 16.4 has the same motion code ($mc_2$) as the subpicture 16.3. Consequently, the transform coding $T_2$ may be applied to the subpicture 16.4 (see also the arrow 18.2) and the coded information of the subpicture, together with the codes $mc_2$, $T_2$, can be recorded in part 17.4 of the record carrier 10. The subpicture 16.5 also has the motion code $mc_2$, so that the transform coding $T_3$ may be applied to this subpicture (see the arrows 18.3 and 18.4) and the coded information and the codes $mc_2$, $T_3$ are recorded in part 17.5 of the record carrier 10.

For determining the motion code a subpicture of a specific picture (for example $B_5$) may be compared with the corresponding subpicture of the picture ($B_4$) preceding this picture ($B_5$). Another possibility is to compare this sub picture with the corresponding subpicture of that picture for which the motion code has been changed most recently (which is the picture $B_3$ in the case of FIG. 4c). In one case the corresponding subpicture (16.6) of the next picture ($B_6$) is compared with the first-mentioned subpicture (16.5). In the other case the subpicture (16.6) of the next picture ($B_6$) is compared with the corresponding subpicture for which the motion code has been changed most recently (16.3). In each case it is found that the motion code of the subpicture 16.6 has been changed to $mc_3$ ($=mc_2+a$). Again the transform coding $T_1$ is applied to the video information of the subpicture and the coded information, together with the codes $mc_3$, $T_1$, is recorded in part 17.6 of the record carrier 10.

Figure 4D:
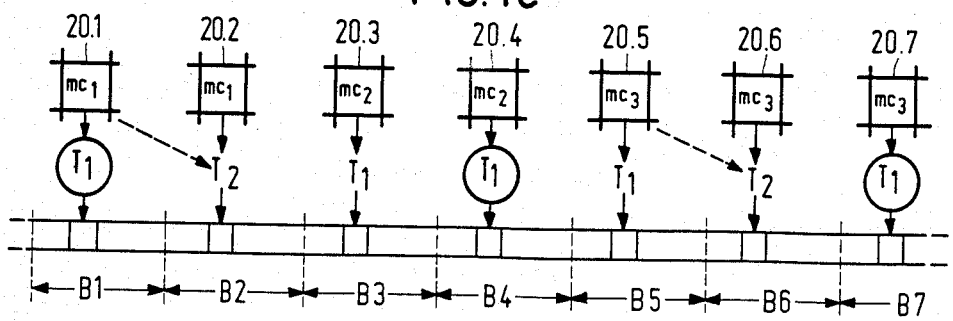

FIG. 4d illustrates a method in which the first transform coding $T_1$ is impressed every $p(=3)$ pictures. The transform coding $T_1$ is impressed when the subpictures 20.1, 20.4 and 20.7 are encoded and this is indicated by the encircled $T_1+s$ in FIG. 4d.

The method of FIG. 4d requires no further explanation after the description of the methods with reference to FIGS. 4a, 4b and 4c.

Figure 5A:
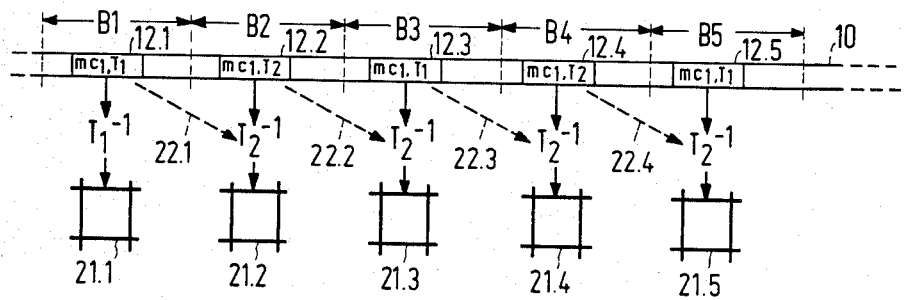
FIGS. 5a to 5d illustrate four methods of reproducing video information from a record carrier.

FIG. 5a illustrates the method of reading video information from the record carrier 10, which information has been recorded by means of the method described with reference to FIG. 4a. The record carrier 10 contains the coded information of the pictures $B_1$ to $B_5$. Parts 12.1 to 12.5 contain the coded information of the subpictures 11.1 to 11.5 respectively in FIG. 4a and the codes $mc_i$, $T_j$ associated with these subpictures.

Assuming that the corresponding subpicture of the picture preceding the subpicture does not have the same motion code as the subpicture 11.1 a coding inverse to the first transform coding $T_1$, represented by $T_1^{-1}$ in FIG. 5a, should be applied to the coded information in part 12.1. This yields the subpicture 21.1. Subsequently, the content of part 12.2 of the record carrier 10 is read. The motion code ($cm_1$) thus read is found to be the same as that of the subpicture 11.1. Consequently, a coding which is inverse to the transform coding $T_2$ and referred to as $T_2^{-1}$ is applied to the coded information read, utilizing the results of the transform coding $T_1^{-1}$ applied to the coded information in part 12.1, see the arrow 22.1. After decoding this yields the subpicture 21.2.

Since the coded information in part 12.2 is a more accurate approximation of the subpicture 11.2 than the coded information of the subpicture 11.1 in part 12.1, it is found that (after decoding) the subpicture 21.2 bears as greater resemblance to the subpicture 11.2 than the subpicture 21.1 to the subpicture 11.1.

Subsequently, the content of part 12.3 is read. Again the motion code is found to be the same as the motion code in part 12.2. Further, part 12.3 contains the transform code $T_1$ and part 12.2 the transform code $T_2$. It is possible to apply the coding $T_1^{-1}$ which is inverse to the first transform coding, to the coded information in part 12.3. However, starting from the coded information in parts 12.2 and 12.3 it is now possible to apply the coding $T_2^{-1}$, which is inverse to the second transform coding, see the arrow 22.2. This yields a subpicture 21.3, which bears a greater resemblance to the subpicture 11.3 than the subpicture which would have been obtained if the coding $T_1^{-1}$ had been applied to the coded information in 12.3. Yet another possibility is to take the subpicture 21.2 for the subpicture 21.3: i.e. to repeat, in fact, the subpicture 21.2. The subpicture 21.4 can again be obtained by applying the transform coding $T_2^{-1}$, starting from coded information in parts 12.3 and 12.4, see the arow 22.3. Another possibility would again have been to repeat the subpicture 21.3 in order to obtain the subpicture 21.4.

In the same way the subpicture 21.5 can be obtained by applying the transform coding $T_2^{-1}$ to the coded information in parts 12.4 and 12.5, see the arrow 22.4, or by repeating the subpicture 21.4. The subpicture 21.5 will then also bear more resemblance to the subpicture 11.5 than in the case that the coded information in part 12.5 is subjected to the trans form coding $T_1^{-1}$.

Figure 5B:
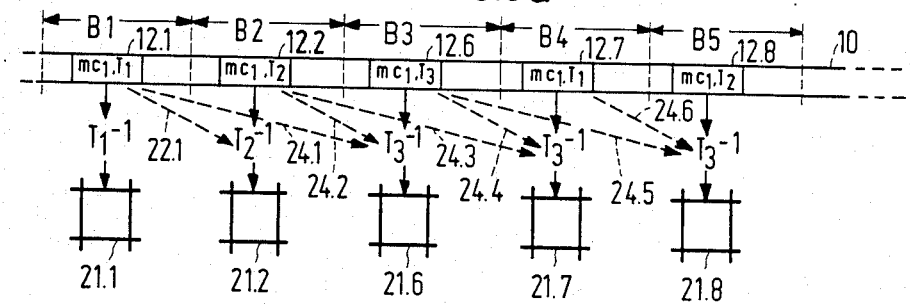

FIG. 5b illustrates a method of reading video information from the record carrier 10, which information has been recorded by the method described with reference to FIG. 4b. Again the record carrier contains the coded information of the pictures $B_1$ to $B_5$. The parts 12.1, 12.2 and 12.6 to 12.8 containing the (coded) information corresponding to the subpictures 11.1 to 11.5 respectively are indicated separately in this Figure.

Decoding the information in parts 12.1 and 12.2 proceeds in the same way as explained with reference to FIG. 4a. Subsequently, part 12.6 is read. It is found that the motion code $mc_1$ is the same as that in parts 12.1 and 12.2 and that the transform code is $T_3$. Consequently, the coded information in part 12.6 may be subjected to the coding $T_3^{-1}$, which is inverse to the transform coding $T_3$, utilizing the coded information in parts 12.1 and 12.2, see the arrows 24.1 and 24.2, after which the subpicture 21.6 is obtained. The subpicture 21.6 bears a greater resemblance to the subpicture 11.3 than the subpicture 21.2 to the subpicture 11.2.

Subsequently, the part 12.7 is read. Again the motion code is the same as that in parts 12.2 and 12.6 and the transform code is $T_1$. Yet it is now possible to apply the coding $T_3^{-1}$, which is the inverse of the third transform coding $T_3$, to the coded information in parts 12.2, 12.6 and 12.7, see the arrows 24.3 and 24.4, after which the subpicture 21.7 is obtained. Another possibility is to repeat the subpicture 21.6.

The subpicture 21.7 obtained by one of these two methods bears a greater resemblance to the subpicture 11.4 than the subpicture which would have been obtained by applying the transform coding $T_1^{-1}$ to the information in part 12.7.

Similarly, by applying the transform coding $T_3^{-1}$ to the information in parts 12.6, 12.7 and 12.8, the subpicture 21.8 can be obtained. Alternatively, the subpicture 21.8 can be obtained by repeating the subpicture 21.7. This subpicture 21.8 also bears a greater resemblance to the subpicture 11.5 than the subpicture which would have been obtained by applying the transform coding $T_2^{-1}$ to the information in parts 12.7 and 12.8.

Figure 5C:
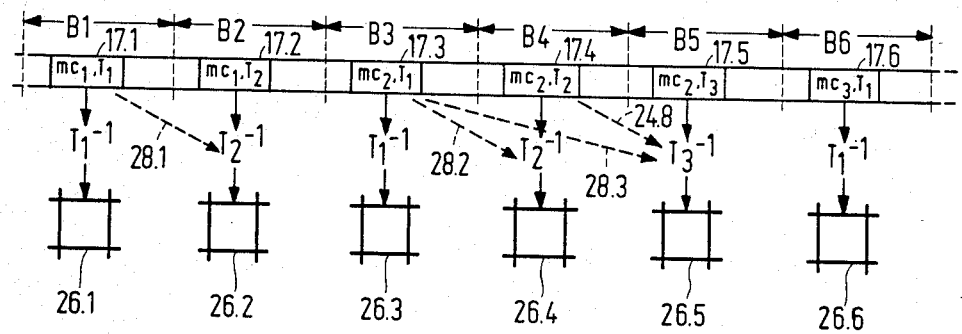

FIG. 5c illustrates a method of reproducing video information recorded by the method as described with reference to FIG. 4c. The information in parts 17.1 and 17.2 is decoded in the same way as described for parts 12.1 and 12.2 with reference to FIG. 5a. The resulting subpicture 26.2 therefore also bears a greater resemblance to the subpicture 16.2 than the subpicture 26.1 to the subpicture 16.1.

Since the next part 17.3 contains another motion code ($mc_2$) than the parts 17.1 and 17.2, the transform coding $T_1^{-1}$ should be applied to the information in part 17.3 in order to obtain the subpicture 26.3. Again the information in part 17.4 can be decoded by means of the transform coding $T_2^{-1}$, see the arrow 28.2, after which the subpicture 26.4 is obtained. The next subpicture 26.5 can be derived from the information in parts 17.3, 17.4 and 17.5 by means of the transform coding $T_3^{-1}$ see the arrows 28.3 and 28.4. As the part 17.6 again contains another motion code ($mc_3$), the transform coding $T_1^{-1}$ should now be applied in order to obtain the subpicture 26.6.

Figure 5D:
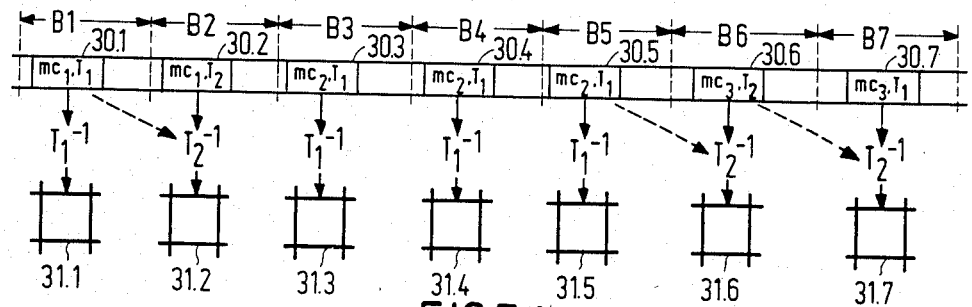

FIG. 5d illustrates a method of reproducing video information recorded in accordance with the method described with reference to FIG. 4d. FIG. 5d is self-explanatory after the description with reference to FIGS. 5a to 5c. Parts 30.1 and 30.2 are decoded to form the subpictures 31.1 and 31.2 respectively in a manner as described with reference to FIG. 5a. Part 30.3 is decoded to form the subpicture 3!.3 by applying the coding $T_1^{-1}$.

The subpicture 31.4 can be obtained either by applying the coding $T_1^{-1}$ to the coded information in part 30.4 or by repeating the subpicture 31.3. This is because the motion codes in parts 30.3 and 30.4 are the same. The coded information in parts 30.5 and 30.6 is decoded in accordance with a coding which is inverse to the coding applied during recording, i.e. the codings $T_1^{-1}$ and $T_2^{-1}$ respectively, yielding the subpictures 31.5 and 31.6 respectively. The subpicture 31.7 can be obtained by applying the coding $T_2^{-1}$ to the information in parts 30.6 and 30.7, because the motion codes are the same ($mc_3$) for both parts. This yields a subpicture 31.7 which bears a greater resemblance to the subpicture 20.7 than in the case that the coding $T_1^{-1}$ had been applied only to the information in part 30.7.

Obviously, the read method as described with reference to FIG. 5 enables the subpictures to be read both in the case of record-carrier transport in the forward and in the reverse direction.

Figure 6:
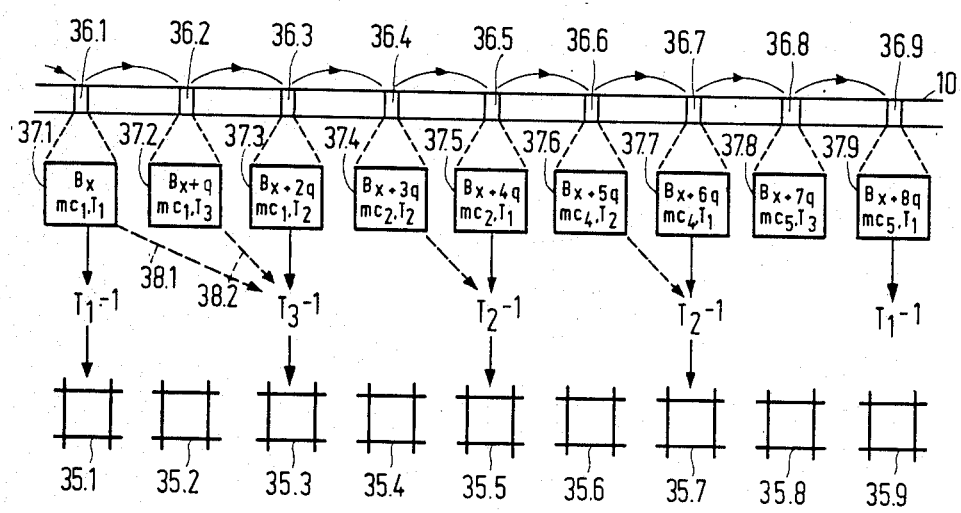
FIG. 6 illustrates a method of reading the record carrier at a higher speed.

FIG. 6 describes a method of reading the information from the record carrier 10 at a higher speed. During reading at a higher speed the pictures $B_x$, $B_{x+q}$, $B_{x+2q}$, . . . etc. are read and the intermediate pictures are skipped. High-speed reading is also possible both in the forward and in the reverse direction.

FIG. 6 illustrates schematically how a subpicture 35.1 of the picture $B_x$ and the corresponding subpictures associated with the pictures $B_{x+q}$ to $B_{x+8q}$ read subsequently can be obtained, namely the pictures 35.2 to 35.9.

The parts 36.1 to 36.9 of the record carrier 10 are identical to the parts 12.1, 12.2, . . . etc., 17.1, 17.2 etc. and 30.1, 30.2, . . . etc. in FIG. 5. Each part contains a motion code $mc_i$, a transform code $T_j$ and the video information of a subpicture encoded by means of the transform coding $T_j$. The block 37.1 to 37.9 represent these parts to an enlarged scale. In these blocks it is indicated to which picture B the corresponding subpictures belong and the associated motion code and transform code are given.

Assuming that the corresponding subpicture of the picture $B_{x-p}$ has another motion code than the subpicture of the block 37.1, the information in this block should be decoded in accordance with the transform coding $T_1^{-1}$ to obtain the subpicture 35.1. Since between the pictures $B_x$ and $B_{x+q}$ a number of pictures, namely $q-1$, are skipped, the transform code of the block 37.2 may be arbitrary and need not necessarily be $T_1$ or $T_2$.

When the information in FIG. 5b is read at 2x the normal speed the information in part 12.1 is read first, after which the information in part 12.6 and then the information in part 12.8 is read. The corresponding transform codes are $T_1$, $T_3$ and $T_2$ respectively, as is apparent from FIG. 6 for the blocks 37.1, 37.2 and 37.3.

However, the information in block 37.2 read from the record carrier 10 is not suitable for deriving the subpicture 35.2, because the information in block 37.1, with the transform code $T_1$, and in block 37.2, with the transform code $T_3$, cannot be combined for a decoding operation. Therefore, the subpicture 35.1 is repeated.

Since the subpicture 37.3 has the same motion code as the blocks 37.1 and 37.2, and block 37.3 has the (missing) transform code $T_2$, it is possible to employ the transform coding $T_3^{-1}$, utilizing the information in blocks 37.1, 37.2 and 37.3, see the arrows 38.1 and 38.2. The resulting subpicture 35.3 now has a higher accuracy (has more detail) than the preceding subpictures 35.1 and 35.2.

As the next block 37.4 has a motion code which is not the same as the motion code of the preceding block 37.3 and block 37.4 also has a transform code which is not $T_1$, the information in block 37.4 cannot be used for the deriving the subpicture 35.4. Therefore, this subpicture is obtained by repeating the subpicture 35.3. The information in blocks 37.4 and 37.5 may be subjected to the coding $T_2^{-1}$, yielding the subpicture 35.5.

What has been stated for block 37.4 also applies to the information in block 37.6. The subpicture 35.6 is obtained by repeating the subpicture 35.5. It is to be noted however, that the picture has changed substantially in between the two subpictures 36.5 and 36.6. The motion code has changed twice, because $mc_4 = mc_3 + a = mc_2 + 2a$.

Under the influence of the transform coding $T_2^{-1}$ the information in blocks 37.6 and 37.7 yields the subpicture 35.7. This subpicture must be repeated in order to obtain the subpicture 35.8. Subsequently, the subpicture 35.9 is obtained by applying the transform coding $T_1^{-1}$ to the information in block 37.9.

Figure 7:
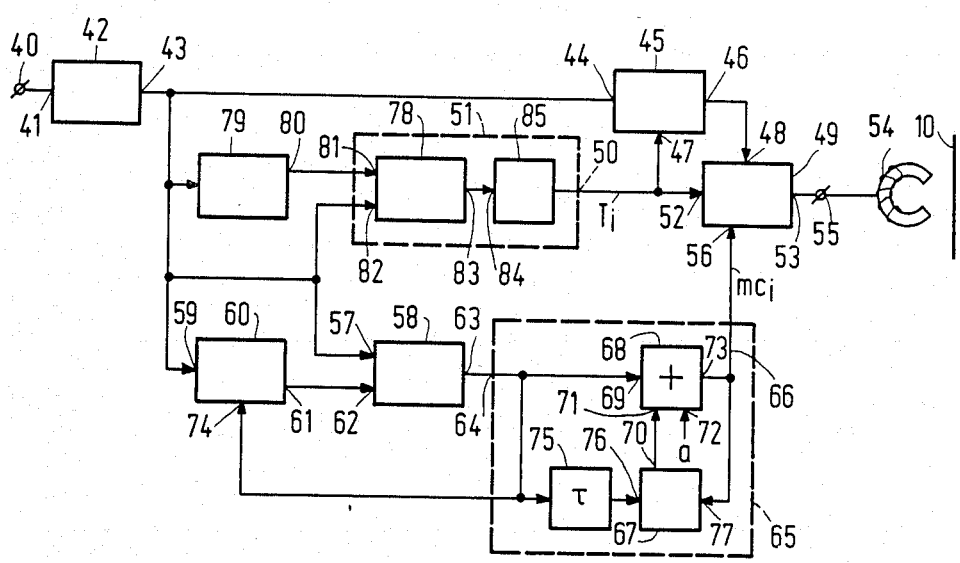
FIG. 7 shows a first apparatus.

FIG. 7 shows an example of an apparatus for recording video information in the record carrier 10. The apparatus comprises an input terminal 40 for receiving the video signal. The input terminal 40 is coupled to an input 41 of a first unit 42. The unit 42 is constructed to divide pictures of $N \times M$ picture elements into subpictures of $n \times m$ picture elements. The output 43 of the unit 42 is coupled to an input 44 of a coding unit 45. The coding unit 45 is constructed to subject the video information of each subpicture to a transform coding.

The coding unit 45 may be adapted to apply the first or the second transform coding $T_1$ and $T_2$ respectively to the video information of a subpicture, as is described with reference to FIG. 4a. The coding unit 45 applies the first or the second transform coding if it receives a first or a second transform code respectively, via its control input 47. If the coding unit 45 is adapted to carry out a first ($T_1$), a second ($T_2$) or a third ($T_3$) transform coding to the video information of a subpicture, as is described with reference to FIG. 4b, the coding unit 45 applies such a coding if it receives a first, a second or a third transform code via its c ontrol input 47. If the coding unit is capable of subjecting the video information of a subpicture to transform codings of even higher orders, it is obvious that more transform codes will be needed.

The output 46 of the coding unit 45 is coupled to an input 48 of a signal combination unit 49. The output 50 of the unit 51 which supplies the transform code to the coding unit 45 is also coupled to an input 52 of the combination unit 49. In the combination unit 49, the transform code associated with a coded subpicture is combined with the coded video information of the subpicture and is transferred to the output 53. The output 53 is coupled to the input 55 of a write unit 54, which is represented schematcally by a write head. The write unit 54 may be, for example, of the helical-scan type. In such a case it comprises two or more write heads. The coded video information of the subpicture, together with the associated transform code $T_j$ and the motion code $mc_i$ applied to the combination unit 49 via a third input 56 is recorded on the record carrier 10 by the write unit 54.

Further, the output 43 of the unit 42 is coupled to a first input 57 of a comparator unit 58 and to an input 59 of a first memory 60, whose output 61 is coupled to a second input 62 of the comparator unit 58.

In the comparator unit 58 the video information of the subpicture which is encoded in the coding unit 45 at a specific instant is compared with the video information of a corresponding subpicture of a previous picture. The video information of the corresponding subpicture of the previous picture is stored in the memory 60. In the situation of FIG. 7 this video information is stored in the form of the luminance and/or the chrominance of each picture element. In another embodiment the coefficients $C(i,j)$ of different subpictures may be compared with each other and the memory 60 stores these coefficients. The input 59 is coupled to the coding unit 45 to supply these coefficients.

In the case of a substantial difference in the video information of the two subpictures (i.e.: if the difference exceeds the aforementioned firstvalue), the comparator unit 58 produces a first control signal in its output 63. In the other case the comparator unit 58 produces a second control signal on its output. This control signal is applied to an input 64 of a second unit 65. The second unit 65 is constructed to supply a first motion code ($mc_1$) or a second motion code ($mc_2$) on its output 66, depending on whether the second of the first control signal is applied to its input 64. This motion code is applied to the input 56 of the combination unit 49, which combines the motion code of a subpicture with the information of this subpicture coded in the coding unit 45 and with the transform code of the subpicture, and which makes the information thus combined available on its output 53.

The second unit 65 may be constructed as follows: The unit 65 combines a memory 67 and an adder unit 68. The input of the second unit 65 is coupled to a control input 69 of the adder unit 68. The output 70 of the memory 67 is coupled to a first input 71 of the adder unit 68. A constant, equal to a, is applied to a second input 72. The memory supplies the first motion code $mc_1$ to the first input 71 of the adder unit. When the comparator unit 58 supplies the second control signal to the control input 69 the motion code $mc_1$ will appear on the output 73 of the adder unit 68 (which also constitutes the output 66 of the second unit 65). If the comparator unit 58 supplies the first control signal to the control input 69 the adder unit 68 adds the constant applied to the input 72 and the motion code applied to the input 71 to each other. The second motion code $mc_2$, which is then equal to $mc_1 + a$, now appears on the output 73. The constant a may be, for example, 1. The output 63 of the comparator unit 58 is also coupled to a load input 74 of the first memory 60 and, via a delay means 75, to a load input 76 of the second memory 67.

When the first control signal appears on the output 63 of the comparator unit 58 this results in the video information of a subpicture on the input 59 being loaded into the first memory 60 and the motion code present on the input 77 being loadedinto the second memory 76 (with a delay). The input 77 is coupled to the output 73 of the adder unit 68. The apparatus operates as follows.

A subpicture of a picture being encoded at a specific instant in the coding unit 45 is simultaneously compared with the corresponding subpicture of a previous picture in the comparator unit 58. If the two subpictures differ substantially from one another the comparator unit 58 supplies the first control signal. This first control signal ensures that instead of the subpicture of the previous picture the subpicture of the first-mentioned picture is stored in the first memory. Further, this first control signal ensures that after the second motion code ($mc_2$) has appeared on the output 73 of the adder unit 68 instead of the first motion code ($mc_1$) this second code is stored in the second memory 67. Thus, a subpicture of a picture is always compared with a corresponding subpicture of that previous picture for which the motion code has been changed most recently.

If a subpicture of a specific picture should always be compared with the corresponding subpicture of a directly preceding picture, the output 63 is not coupled to the control input 74 but a central control unit (not shown) supplies a load pulse to the control input 74 after every comparison in the comparator unit 58, so that the subpicture of the first-mentioned picture is loaded into the memory 60.

It is obvious that all subpictures of the (not necessarily the same) picture are stored in the memory 60. Depending on the subpicture supplied by the first unit 42 the corresponding subpicture in the memory 60 is addressed by means of an associated address signal (not shown) which is applied from the central control unit to an address input (not shown) of the first memory 60, so that this corresponding subpicture appears on the output 61 and can be applied to the second input 62 of the comparator unit 58. It is also obvious that for all subpictures of a (not necessarily the same) picture the motion codes are stored in the second memory 67. When a specific subpicture and the corresponding subpicture from the first memory are compared in the comparator unit 58 the motion code associated with the subpicture stored in the first memory 60 is also applied to an address input (not shown) of the second memory 67 by means of the address signal mentioned above. Subsequently, the motion code appears on the output 70 of the second memory 67.

The block 51 comprises a comparator unit 78 which operates in the same way as the comparator unit 58. The comparator unit compared the video information of corresponding subpictures of two pictures. One subpicture is stored in the third memory 79, which has an output 80 coupled to an input 81 of the comparator unit 78, and the other subpicture is supplied by the first unit 42. The output 43 of this unit is therefore coupled to the input 82 of the comparator unit 78. One output 83 of the comparator unit 78 is coupled to an input 84 of a counter 85, whose output constitutes the output 50 of the block 51. For carrying out the method described with reference to FIG. 4a, the counter 5 is constructed as a modulo-2 counter.

During encoding of the subpicture 11.1 in FIG. 4a the counter 85 is set to the value "1". This is the first transform code $T_1$, which is applied to the control input 47 of the coding unit and which inititates the first transform coding $T_1$ applied to the subpicture 11.1. Moreover, the transform code is applied to the input 52 of the combination unit 49. In addition, the subpicture is stored in the memory 79. At the instant at which the subpicture 11.2 is supplied by the unit 42 the difference between the video information of the subpicture 11.2 and that of the subpicture 11.1 (stored in the memory 79) appears to be smaller than said second value. This results in a second control signal on the output 83 of the comparator unit 78, causing the counter 85 to be incremented by one and thus to be set to the value "2". The coding unit now codes the subpicture 11.2 in accordance with the seocnd transform coding $T_2$. For applying the second transformation coding to the subpicture 11.2 the coding unit 45 requires additional storage capacity for storing the video information (which may be coded or not) of the subpicture 11.1. In the case of FIGS. 3b and 3c this memory isa memory for the storage of the coefficients $Cq_1(i,j)$. Moreover, instead of the subpicture 11.1 the subpicture 11.2 is stored in the memory 79.

When the video information of the subpicture 11.3, supplied by the unit 42, is compared with the video information of the subpicture 11.2 stored in the memory 79, the comparator unit 78 again supplies the second control signal. The counter 85 is again incremented by one. The count now becomes "1" because the counter is a modulo-2 counter. The video information of the subpicture 11.3 is now subjected to the first transform coding $T_1$. Moreover, the subpicture 11.3 instead of the subpicture 11.2 is now stored in the memory 79.

For carrying out the method described with reference to FIG. 4b the counter 85 is a modulo-3 counter. In this case, after the video information of the subpicture 11.2 and that of 11.3 have been compared with one another (assuming that with this method corresponding subpictures of directly succeeding pictures are also continually compared with one another), the counter 85 will be incremented by one and set to "3" under the influence of the second control signal. The coding unit 45 now performs the third transform coding $T_3$. For this purpose the coding unit 45 needs additional storage capacity for the storage of the video information (which may have been encoded or not) of the two preceding subpictures 11.1 and 11.2. In the example of FIGS. 3b, 3c and 3d, this means that a memory is needed for the storage of the coefficients $Cq_1(i,j)$ and $Cq_2(i,j)$.

When the subpicture 11.4 (FIG. 4b) supplied by the unit 42 is compared with the subpicture 11.3 stored in the memory 79, the comparator unit 78 again supplies a second control signal. The counter 85 is then incremented by one. Since the counter is a modulo-3 counter the count now becomes "1". The first transform coding $T_1$ is then applied to the subpicture 11.4.

Now the situation in FIG. 4c is considered, when the subpicture 16.3 is supplied to the comparator unit 78 by the unit 42 and this comparator unit compares said subpicture with the subpicture 16.2 stored in the memory 79. The comparator unit 78 now supplies the first control signal to the counter 85. Under the influence of the first control signal the counter 85 is always reset to its initial count, i.e. the value "1". This means that the coding unit 45 applies the first transform coding $T_1$ to the subpicture 16.3.

In accordance with FIG. 4d, the first transform coding $T_1$ is impressed every three (sub)pictures. In the situation shown in FIG. 7, this can be achieved by applying a control signal to the reset input (not shown) of the counter by means of said central control unit (not shown) at the instant at which the subpictures 20.1, 20.4, 20.7 etc. are supplied, causing the counter to be reset to its initial count, i.e. to the value "1".

It is obvious that if the apparatus shown in FIG. 7 is capable of subjecting the video signal to a higher-order transform codings the counter 85 and the coding unit 45 should be adapted accordingly.

Obviously, a subpicture of a specific picture may also be compared with a corresponding subpicture of a picture other than the picture immediately preceding it. For example, the subpicture of a specific picture may be compared with the latest corresponding subpicture to which the first transform coding $T_1$ has been applied. This may be achieved, for example, by connecting the output 50 to a load input (not shown) of the memory 79 via a gate circuit (not shown), which only transfers the first transform code (the value "1" of the counter).

It is obvious that the memory 79 should have a storage capacity adequate for the storage of the video information of all the subpictures of a (not necessarily the same) picture. It is also evident that the block 85 in fact comprises as many counters as there are subpictures in a picture and that when a subpicture is compared with a corresponding previous subpicture the appropriate counter, i.e. the counter corresponding to this subpicture, should be addressed.

Figure 8:
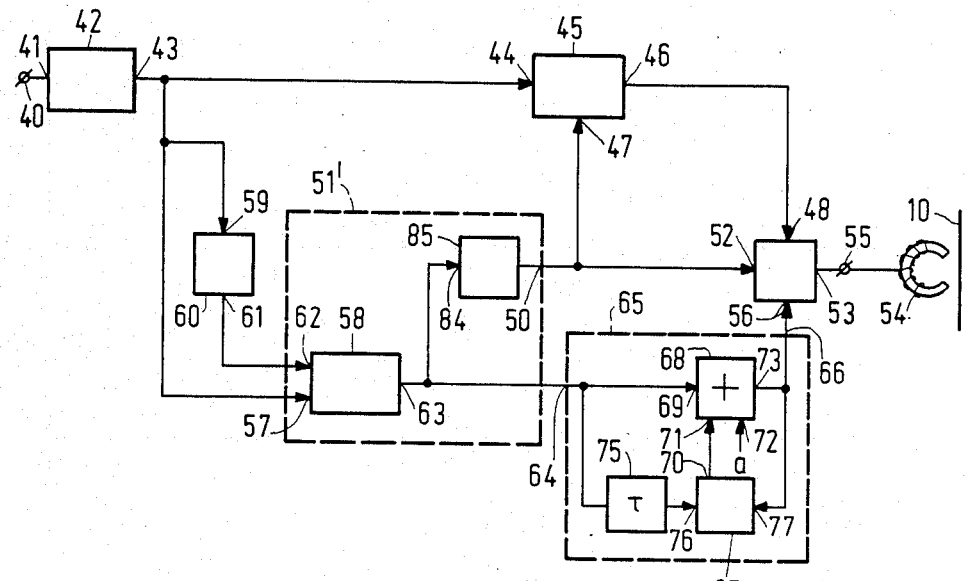
FIG. 8 shows a second apparatus for recording video information in a record carrier.

If in the example of FIG. 7 the first and the second value are equal and corresponding subpictures of directly succeeding pictures are each time compared with each other, the apparatus can be simplified. This simplified apparatus is shown in FIG. 8. Now only one comparator unit 58 and one memory 60 are needed. This means that the comparator unit 78 and a memory 79 may be dispensed with. The output 63 of the comparator unit 58 is now coupled to the control input 84 of the counter 85. The operation of the apparatus shown in FIG. 8 is the same as the operation of the apparatus as shown in FIG. 7, so that no further explanation is required.

Figure 9:
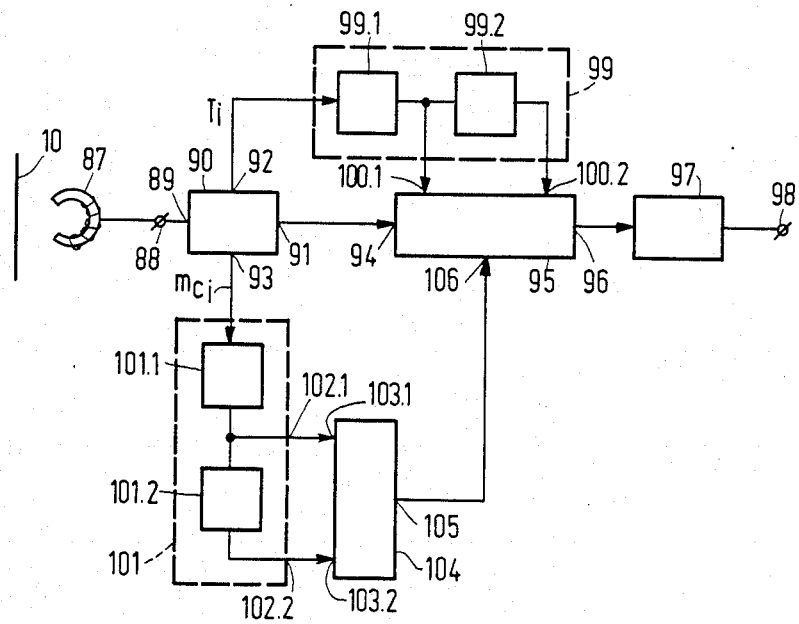
FIG. 9 shows a first apparatus.

FIG. 9 shows an example of an apparatus for reproducing video information from a record carrier 10 as described with reference to FIG. 5a. The apparatus comprises a read unit 87, schematically represented as a read head. Again the read unit 87 may be of the helical-scan type, in which case it comprises two or more read heads 87. The output 88 of the read unit 87 is coupled to an input 89 of a unit 90. The unit 90 is constructed to extract the coded video information of a subpicture from the information read from the record carrier by the read unit 87 and to apply this information to a first output 91. The transform code associated with a subpicture is extracted by the unit 90 and applied to a second output 92. Further, the unit 90 extracts the motion code mc associated with a subpicture from the information read from the record carrier 10 and supplies this information to a third output 93.

The output 91 is coupled to an input 94 of a decoding unit 95. The decoding unit 95 is constructed to apply transform decodings to the coded information of a subpicture read from the record carrier and to supply the decoded video information of the subpicture to an output 96. A (third) unit 97 is coupled to the output 96, which unit derives pictures of NxM picture elements from the subpictures received from the decoding unit 95 and supplies these to the output terminal 98.

The second output 92 is coupled to a first control input 100, comprising two sub-inputs 100.1, 110.2, of the decoding unit 95 via a memory 99 comprising two storage locations 99.1, 99.2 for the storage of the transform codes of corresponding subpictures of two consecutive pictures. The third output 93 is coupled to a memory 101 comprising two storage locations 101.1, 101.2 for the storage of the motion codes associated with said two subpictures. The output 102 of the memory 101 is coupled to the input 103 of a comparator 104, (which has an output 105 coupled to a second control input 106 of the decoding unit 95. The coupling between the memory 101 and the comparator 104 is such that the outputs 102.1 and 102.2 of the two storage locations 101.1 and 102.2 respectively are coupled to the respective sub-inputs 103.1 and 103.2 of the comparator 104. At the instant at which the information in part 12.1 of the record carrier 10 is decoded (see FIG. 5a) the extracted coded video information is applied to the input 94 of the decoding unit 95, and the associated motion code $mc_1$ is stored in the storage location 101.1 and the associated transform code $T_1$ is stored in the storage location 99.1. In the description with reference to FIG. 5a, it has been assumed that the motion code of the corresponding subpicture of the immediately preceding picture, which code is stored in the storage location 101.2, was not $mc_1$. The comparator 104 compares the two motion codes and supplies a (fourth) control signal to the control input 106 of the decoding unit 95. As the decoding unit 95 receives the transform code $T_1$ on its control input 100.1, the coded video information applied to the input 94 is subjected to the transform coding $T_1^{-1}$ the decoding unit under the influence of the control signals on the inputs 100.1 and 106. The subpicture 21.1 appears on the output 96. The (fourth) unit 90 now supplies the video information from part 12.2 (FIG. 5a) to the input 94, the transform code $T_2$ to the storage location 99.1, and the motion code $mc_1$ to the storage location 101.1. This means that the transform code $T_1$ from the part 12.1 is shifted to the storage location 99.2 and the transform code $T_2$ is loaded into the storage location 99.1. In the same way the motion code $mc_1$ from the part 12.1 is shifted to the storage location 101.2 and the motion code $mc_1$ from part 12.2 is loaded into the storage location 101.1. In fact, the memories 99 and 101 are shift registers.

The comparator 104 now supplies a third control signal to its output 105. The decoding unit receives this third control signal via its control input 106 and, moreover, detects the contents of the storage locations 99.1 and 99.2 via its inputs 100.1 and 100.2. The contents of these storage locations are $T_2$ and $T_1$ respectively. The decoding unit 95 now applies the transform decoding $T_2^{-1}$ starting to the coded video information from parts 12.2 and 12.1. Therefore, the decoding unit must have storage capacity for the storage of the video information (which may already be coded) from part 12.1 of the record carrier. In the situation illustrated in FIGS. 3b and 3c this means: a memory for the storage of the coefficients $Cq_1(i,j)$. Subsequently, the subpicture 21.1 appears on the output 96.

Now the part 12.3 is read. The information in the memory 99 is shifted again, so that the transform code $T_1$ (from the part 12.3) is stored in the storage location 99.1 and the transform code $T_2$ (from the part 12.2) is stored in the storage location 99.2. The information in the memory 101 is also shifted, so that in the storage location 101.1 the motion code $mc_1$ (from the part 2.3) and in the storage location 101.2 the motion code mc1 (from the part 12.2) is stored. Again, the comparator 104 supplies the third control signal to the control input 106 of the decoding unit 95. The decoding unit 95 can again apply the transform decoding $T_2^{-1}$ in this case, to the coded video information from parts 12.2 and 12.3. This process continues and each time yields the pictures 21.3, 21.4 etc. from FIG. 5a.

Figure 10:
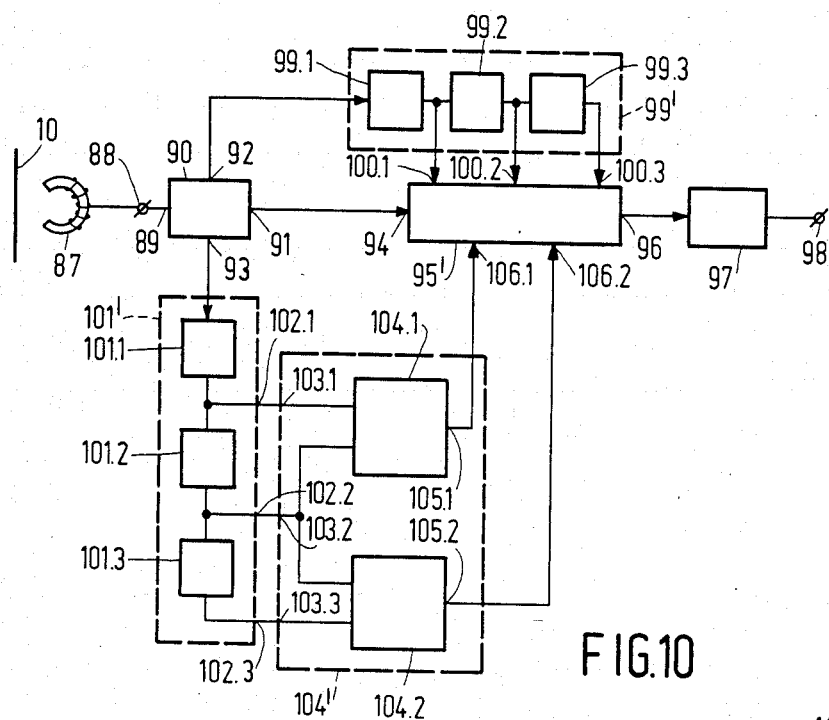
FIG. 10 shows asecond apparatus.

FIG. 10 shows an apparatus for reproducing video information as described with reference to FIG. 5b. The memory 99' now comprises three storage locations 99.1, 99.2 and 99.3 for the storage of the transform codes of corresponding subpictures of three consecutive pictures. Similarly, the memory 101' has three storage locations 101.1, 101.2, 101.3 for the storage of the motion codes of corresponding subpictures of three consecutive pictures. The comparator 104 comprises two comparator units 104.1 and 104.2 which respectively compare the motion codes in the storage locations 101.1 and 101.2 and those in the storage locations 101.2 and 101.3 with one another. The outputs 105.1 and 105.2 of the comparator units 104.1 and 104.2 respectively are coupled to the control inputs 106.1 and 106.2 which together form the second control input 106 of the decoding unit 95'.

The outputs of the storage locations 99.1, 99.2 and 99.3 are coupled to control inputs 100.1, 100.2 and 100.3 respectively, which together constitute the first control input 100.

After the information in part 12.1 (FIG. 5b) has been read from the record carrier 10 the motion code $mc_1$ is loaded into the storage location 101.1 and the transform code $T_1$ into the storage location 99.1. The comparator unit 104.1 compares the motion code $mc_1$ in the storage location 101.1 with that in the storage location 101.2. It is assumed that these two motion codes are not equal to each other, so that the fourth control signal is applied to the input 106.1 of the decoding unit 95'. Under the influence of this control signal and the transform code $T_1$ applied to the input 100.1 the decoding unit performs the transform decoding $T_1^{-1}$ Subsequently, the information is read from the part 12.2. The motion code $mc_1$ associated with the subpicture 21.1 is shifted into the storage location 101.2 and the motion code mc1 read from the part 12.2 is stored in the storage location 101.1. The transform code $T_1$ corresponding to the subpicture 21.1 is shifted into the storage location 99.2 and the transform code $T_2$ read from the part 12.2 is stored in the storage location 99.1 The comparator unit 104.1 detects equality of the two motion codes in the storage locations 101.1 and 101.2 and supplies the third control signal to the input 106.1. Since the decoding unit 95' detects the presence of the second and the first transform code $T_2$ and $T_1$ respectively on its inputs 100.1 and 100.2, the decoding unit 95' performs the transform decoding $T_2^{-1}$.

Subsequently, the information is read from the part 12.6 (FIG. 5b). The information in the storage locations 101.1 and 101.2 is shifted to the storage locations 101.2 and 101.3 and the motion code $mc_1$ from the part 12.6 is stored in the storage location 101.1. Similarly, the information in the storage locations 99.1 and 99.2 is shifted by one position and the transform code $T_3$ from the part 12.6 is read out of the storage location 99.1. The motion code in the storage locations of the memory 101' are equal to each other. The comparator 104' now supplies a fifth control signal to the control input 106, i.e. two third control signals from the comparator units 104.1 and 104.2 are applied to the inputs 106.1 and 106.2 respectively. Under the influence of these signals and as a result of the fact that the third, the second and the first transform code are applied to the inputs 100.1, 100.2 and 100.3 respectively, the decoding unit 95' carries out the transform decoding $T_3^{-1}$ in order to obtain the subpicture 21.6. It is evident that the decoding unit 95' should have a storage capacit which is adequate for the storage of the video information (which may already have been decoded) from parts 12.1 and 12.2, which is necessary for carrying out the transform coding $T_3^{-1}$. In the example of FIGS. 3b, c and d this means therefore: a memory for the storage of the coefficients $Cq_1(i,j)$ and $Cq_2(i,j)$.

Subsequently, the information from the part 12.7 is read. The information in the memories 101' and 99' is again shifted and the motion codes mc1 and the transform code $T_1$ from part 12.7 is stored in the storagelocations 101.1 and 99.1 respectively.

As a result of the fifth control signal on the input 106 and the transform codes $T_1$, $T_3$ and $T_2$ on the respective inputs 100.1, 100.2 and 100.3, the decoding unit 95' again performs the transform coding $T_3^{-1}$ in order to obtain the subpicture 21.7.

The operation of the apparatus for reproducing the remaining subpicture 21.8 in FIG. 5b and the operation of the apparatus for carrying out the methods as described with reference to FIGS. 5c and 5d is assumed to be sufficiently clear now.

What remains to be explained is the operation during reproduction at a higher speed as described with reference to FIG. 6. Again the motion code of the corresponding subpicture of the picture $B_{x-q}$ is not $mc_1$. After the information has been read from the part 36.2 of the record carrier the storage locations 99.1 and 99.2 contain the transform codes $T_3$ and $T_1$ respectively and the two storage locations 101.1 and 101.2 contain the motion code $mc_1$. Consequently, the comparator unit 104.1 supplies the third control signal to the input 106.1 As the transform codes $T_3$ and $T_1$ are now applied to the inputs 100.1 and 100.2 neither the transform coding $T_3^{-1}$ nor the transform coding $T_1^{-1}$ may be used. The subpicture 35.1 is now repeated and consequently appears on the output 96 of the decoding unit for the second time.

Subsequently, the information from the part 36.3 is read. After the various codes have been extract the storage locations 99.1, 99.2 and 99.3 contain the transform codes $T_2$, $T_3$ and $T_1$ respectively and all the storage locations 101.1, 101.2 and 101.3 contain the motion code $mc_1$. The comparator 104' now again supplies the fifth control signal to the input 106, so that the decoding unit 95' can perform the transform coding $T_3^{-1}$. After this, the information is read from the part 36.4. This results in the storage locations 99.1, 99.2 and 99.3 containing $T_2$, $T_2$ and $T_3$, respectively and the storage locations 101.1, 101.2, 101.3 containing $mc_2$, $mc_1$ and $mc_1$ respectively. Therefore, the comparator unit 104.1 supplies the fourth control signal to the input 106.2. It is to be noted that in all cases where the comparator unit 104.1 supplies a fourth control signal a third control signal from the comparator unit 104.2 has no effect. As the transform coding $T_1^{-1}$ cannot be applied to the information read from the part 36.4 the decoding unit 95' repeats the subpicture 35.3.

Figure 11:
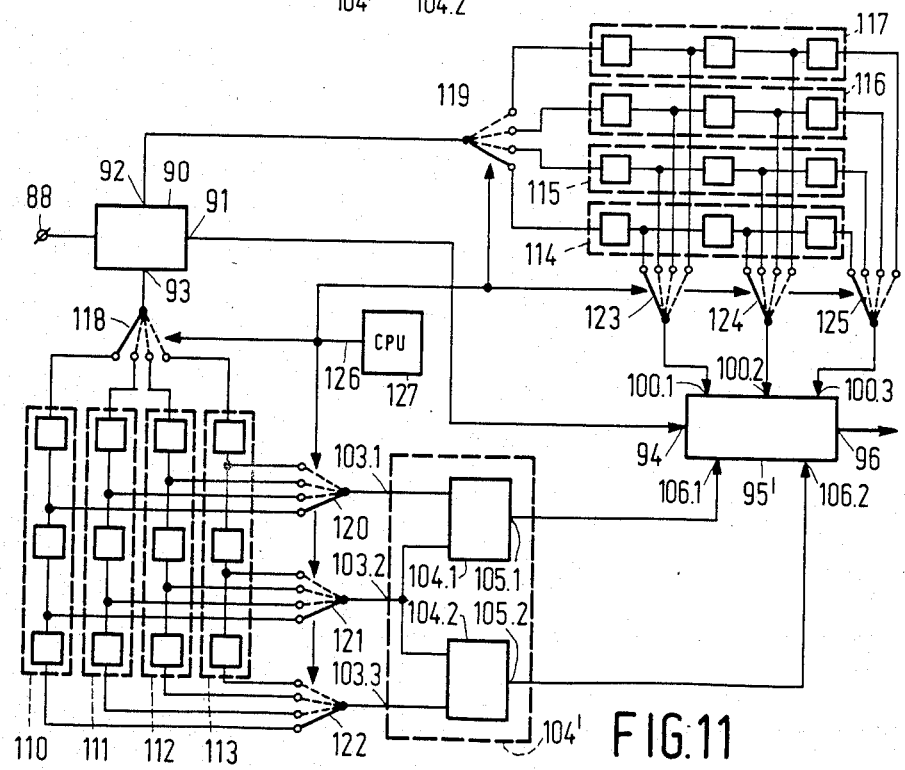
FIG. 11,shows a third apparatus for reproducing video information from a record carrier.

It will be appreciated that the memories 101 and 101' in FIGS. 9 and 10 in fact comprise a number of shift registers as is indicated by 101.1, 101.2 and by 101.1, 101.2, 101.3 respectively which number corresponds to the number of subpictures in a picture. Similarly, the memories 99 and 99' in FIGS. 9 and 10 comprise a number of shift register such as 99.1, 99.2 and 99.1, 99.2 and 99.3 respectively corresponding to the number of subpictures in a picture. This is represented schematically in FIG. 11, which shows a part of the apparatus shown in FIG. 10 for a picture comprising four subpictures. Instead of one shift register 101' in FIG. 10, there are now four shfit registers 110 to 113. Each shift register, such as 110, contains three motion codes associated with corresponding subpictures of three directly succeeding pictures. Similarly, instead of one shift register 99', there are four shift registers 114 to 117. Each shift register, such as 114, contains three transform codes associated with corresponding subpictures of three directly succeeding pictures. Further, switches 118 and 119 respectively are arranged between the shift registers 110 to 113 and 114 to 117 and the outputs 93 and 92 respectively of the unit 90. Moreover, switches are arranged between the outputs of the first storage locations of the shift registers 110 to 113 and the input 103.1 of the comparator unit 104' (switch 120), between the outputs of the second storage locations of these shift registers and the input 103.2 of this comparator unit (switch 121), and between the outputs of the last storage locations of the shift registers and the input 103.3 of this comparator unit (switch 122). Finally, a switch is arranged between the outputs of the first storage locations of the shift registers 114 to 117 and the input 100.1 of the decoding unit 95' (switch 123), between the outputs of the second storage locations of these shift registers and the input 100.2 (switch 124) and between the outputs of the last storage locations of the shift registers and the input 100.3 (switch 125). The switches 118 to 125 are all controlled by a control or address signal 126 which is supplied by the central control unit 127. The The control unit ensures that these switches are all set to the correct positions, for example as is indicated in FIG. 11 for reading a subpicture of a specific picture. If another subpictures of the same picture is read, the control unit 127 sets the switches 118 and 119 to the positions in which the output 93 and 92 of the unit 90 are coupled to the shift registers 111 and 115 respectively. Moreover, the control unit 127 sets the switches 120 to 122 to positions in which the outputs of the storage locations of the shift register 111 are coupled to the inputs 103 of the comparator unit 104'. Similarly, the control unit 127 sets the switches 123 to 125 to positions in which the outputs of the storage locations of the shift register 115 are coupled to the inputs 101 of the decoding unit 95'. For the next subpicture of the same picture the switches 118 and 119 are set to a position such that the shift registers 112 and 116 are coupled to the outputs 93 and 92 respectively of the unit 90, the switches 120, 121 and 122 are switched so that the outputsof the shift register 112 are coupled to the inputs 103, and the switches 123, 124 and 125 are set to such positions that the outputs of the shift tegister 116 are coupled to the inputs 100 etc.

What is claimed is:

1. A method of recording video information in a record carrier comprising the steps of, dividing each picture of a sequence of pictures comprising N×M picture elements into subpictures of n×m picture elements, encoding the video information of each subpicture in accordance with a transform coding and recording the encoded information of the subpicture on the record carrier, during recording, assigning a motion code to all subpictures, said motion code being derived by the steps of comparing the video information of corresponding subpictures of a specific picture and of a previous picture with each other, assigning a first motion code to the subpicture of the first-mentioned picture if the difference between the video information of the two subpictures is smaller than or equal to a specific first value, assigning a second motion code to the subpicture of the first-mentioned picture is the difference between the video information of the two subpictures exceeds the first value, and recording the motion codes together with the encoded video information of the associated subpictures on the record carrier, and further comprising the steps of encoding a subpicture of a specific picture in accordance with a first transform coding, encoding the corresponding subpicture of the next picture in accordance with the same transform coding if the difference between the video information of the two subpictures exceeds a specific second value, encoding the corresponding subpicture of the next picture in accordance with a second transform coding if the difference between the video information of the two subpictures is smaller than or equal to the second value, wherein utilizing the results of the first transform coding applied to the first-mentioned subpicture, the second tranform coding provides a more accurate coding of the video information of the subpicture of the next picture, and recording together with the encoded video information of the subpicture of the next picture, the information about the transform coding applied to the video information of the subpicture of the next picture on the record carrier.

2. A method as claimed in claim 1, in which the second transform coding is applied to the corresponding subpicture of the next picture, wherein the corresponding subpicture of the next but one picture is encoded in accordance with the first transform coding if the difference between the video information of the subpictures of the next but one picture and the first-mentioned or the next picture exceeds said second value, and wherein the corresponding subpicture of the next but one picture is encoded in accordance with a third transform coding if said difference is smaller than or equal to said second value, wherein utilizing the result of the first and the second transform coding applied to the subpicture of the first-mentioned picture and the corresponding subpicture of the next picture respectively, the third transform coding provides an even more accurate coding of the video information of the subpicture of the next but one picture, and wherein together with the encoded video information of the subpicture of the next but one picture the information about the transform coding applied to the video information of the subpicture of the next but one picture is recorded on the recorded carrier.

3. A method as claimed in claim 2, in which the third transform coding is applied to the corresponding subpicture of the next but one picture, wherein the corresponding subpicture of the picture following said next but one picture is encoded in conformity with the first transform coding.

4. A method as claimed in claim 1, in which the second transform coding is applied to the corresponding subpicture of the next picture, wherein the corresponding subpicture of the next but one picture is encoded in accordance with the first transform coding.

5. A method as claimed in claim 1, wherein the first value is equal to the second value.

6. A method as claimed in claim 1, wherein each subpicture is coded in accordance with the first transform coding after every p pictures.

7. A method of reproducing video information from a record carrier, which video information has been recorded in the record carrier in accordance with a method as claimed in claim 1, in which during reproduction the encoded information of the subpictures is read from the record carrier, the encoded information of each subpicture is decoded in accordance with a specific transform decoding, and the video information for consecutive pictures of N×M picture elements is derived from the video information of consecutive subpictures of nxm picture elements, wherein during reproduction together with the encoded vieo information of each subpicture, the motion code associated with said subpicture is read from the record carrier.

8. A method as claimed in claim 7, for reproducing video information from a record carrier, together with the coded video wherein, information of each subpicture, the information about the transform coding applied to the video information of a subpicture during recording is read from the record carrier.

9. A method as claimed in claim 8, wherein, if the motion codes of a subpicture of a subpicture of a previously read picture are not the same, the information of the two subpictures read from the record carrier is not combined to provide a more accurate subpicture at said instant.

10. A method as claimed in claim 9, wherein if the relevant subpicture of the picture read at the relevant instant has been coded in accordance with the first transform coding during recording, the information of the relevant subpicture thus read is subjected to a coding which is the inverse of said first transform coding and, if the relevant subpicture of the picture read at the relevant instant has been encoded in accordance with a transform coding other than the first transform coding during recording, the corresponding subpicture of a picture previously read is repeated.

11. A method as claimed in claim 8, wherein if the motion codes of a subpicture of a picture read at a specific instant and of a corresponding subpicture of a picture read previously are the same and, moreover, one of the two subpictures has been coded in accordance with the first transforming coding during recording and the other one of the two subpictures has been coded in accordance with the second transform coding during recording, the information of the two subpictures read from the record carrier may be combined to obtain a more accurate subpicture at said instant.

12. A method as claimed in claim 8, wherein if the motion codes of a subpicture of a picture read at a specific instant and of the corresponding subpictures of two pictures read previously are equal and, moreover, during recording one of the three subpictures has been encoded in accordance with the first transform coding, a second of the three subpictures in accordance with the second transform coding and the third of the three subpictures in accordance with the third transform coding, the information of the three subpictures read from the record carrier is combined to obtain a more accurate subpicture at said instant.

13. An apparatus for recording video information in a record carrier comprising an input terminal for receiving a video signal, a first unit having an input coupled to the input terinal and having a output, for dividing consecutive pictures of N×M picture elements into subpictures of nxm picture elements, a coding unit having an input coupled to the output of the first unit, and having an output, for subjecting the video information of each subpicture to a transform coding, a write unit having an input coupled to the output of the coding unit, for recording the coded information of each subpicture on the record carrier, a comparator unit having a first input and a second input and an output, for comparing the video information which may have been transformed already of corresponding subpictures of a specific picture and of a previous picture, and for determining whether the difference between the video information, which may have been transformed already, of the two subpictures exceeds or does not exceed said first value, and for producing on it output a first control signal or a second coupled to the first input of the comparator unit, for storing the video information (which may have been transformed already) of the corresponding subpicture of the previous picture, a second unit having an input coupled to the output of the comparator unit and having an output, for producing a first motion code or a second motion code on its output, depending on the control signal from the comparator unit, and a signal combination unit having a first input coupled to the output of the encoding unit, having a second input coupled to the input of the write unit, for adding the first or the second motion code to the coded video information of the relevant subpicture of the first-mentioned picture, wherein the coding unit is adapted to subjct the corresponding subpicture of the next picture to at least the first or the second transform coding depending on a first or a second transform code to be applied to a control input of the coding unit, wherein the apparatus further comprises a second comparator unit having a first and a second input and having an output, for comparing the video information, which may have been transformed already, of the corresponding subpictures of the first-mentioned picture and the next picture with one another, and to determine whether the difference between the video information, which may have been transformed already, of the two subpictures exceeds or does not exceed said second value, and to produce on its output the first or the second transform code, as appropriate, which output is coupled both to the control input of the coding unit and to a third input of the signal combination unit, which signal combination unit is further adapted to add the first or the second transform code to the coded video information of the relevant subpicture of the next picture.

14. An apparatus as claimed in claim 13, wherein the coding unit is, moreover, adapted to subject the corresponding subpicture of the next but one picture to the third transform code depending on a third transform code supplied by the second comparator unit, and wherein the second comparator unit is adapted to supply the third transform code if the difference between the video information (which may have been transformed already), of the corresponding subpictures of the next but one picture and the first-mentioned or the next picture is smaller than or equal to said second value, and to subject the corresponding subpictures of the first-mentioned and the next picture to the first and second transform coding respectively.

15. A method as claimed in claim 14, wherein the second comparator unit is further adapted to supply the first transform code during recording of the corresponding subpicture of the picture following said next but one picture if the first, the second and the third transform coding have been applied to the corresponding subpictures of the first-mentioned picture, the next picture and the next but one picture respectively.

* * * * *